US011754515B2

(12) United States Patent
Matsushima et al.

(10) Patent No.: US 11,754,515 B2
(45) Date of Patent: Sep. 12, 2023

(54) TRANSMISSIVE SMALL-ANGLE SCATTERING DEVICE

(71) Applicant: RIGAKU CORPORATION, Akishima (JP)

(72) Inventors: Naoki Matsushima, Tokyo (JP); Kiyoshi Ogata, Tokyo (JP); Sei Yoshihara, Saitama (JP); Yoshiyasu Ito, Tokyo (JP); Kazuhiko Omote, Tokyo (JP); Hiroshi Motono, Tokyo (JP); Shigematsu Asano, Tokyo (JP); Katsutaka Horada, Tokyo (JP); Sensui Yasuda, Tokyo (JP)

(73) Assignee: RIGAKU CORPORATION, Akishima (JP)

( * ) Notice: Subject to any disclaimer, the term of this patent is extended or adjusted under 35 U.S.C. 154(b) by 160 days.

(21) Appl. No.: 17/442,169

(22) PCT Filed: Jan. 8, 2020

(86) PCT No.: PCT/JP2020/000234
§ 371 (c)(1),
(2) Date: Sep. 23, 2021

(87) PCT Pub. No.: WO2020/194986
PCT Pub. Date: Oct. 1, 2020

(65) Prior Publication Data
US 2022/0170869 A1      Jun. 2, 2022

(30) Foreign Application Priority Data

Mar. 28, 2019   (JP) ................................ 2019-065112

(51) Int. Cl.
*G01N 23/201*  (2018.01)
*G01N 23/20016*  (2018.01)
*G01N 23/20025*  (2018.01)

(52) U.S. Cl.
CPC ..... *G01N 23/201* (2013.01); *G01N 23/20016* (2013.01); *G01N 23/20025* (2013.01);
(Continued)

(58) Field of Classification Search
None
See application file for complete search history.

(56) References Cited

U.S. PATENT DOCUMENTS

2009/0213992 A1    8/2009  Iwasaki
2012/0045033 A1*   2/2012  Stuke .................. G01M 17/013
                                                378/62
(Continued)

FOREIGN PATENT DOCUMENTS

JP    2004-177248 A    6/2004
JP    2005-221362 A    8/2005
(Continued)

OTHER PUBLICATIONS

International Search Report dated Mar. 10, 2020, issued in counterpart application No. PCT/JP2020/000234 (3 pages).
(Continued)

*Primary Examiner* — Hoon K Song
(74) *Attorney, Agent, or Firm* — WHDA, LLP

(57) ABSTRACT

A transmission type small-angle scattering device of the present invention includes a goniometer 10 including a rotation arm 11. The rotation arm 11 is freely turnable around a θ-axis extending in a horizontal direction from an origin with a vertical arrangement state of the rotation arm being defined as the origin, and has a vertical arrangement structure in which an X-ray irradiation unit 20 is installed on a lower-side end portion of the rotation arm 11, and a two-dimensional X-ray detector 30 is installed on an upper-side end portion of the rotation arm 11 to form a vertical arrangement structure.

6 Claims, 20 Drawing Sheets

(52) U.S. Cl.
CPC .............. *G01N 2223/054* (2013.01); *G01N 2223/3306* (2013.01); *G01N 2223/6116* (2013.01)

(56) References Cited

U.S. PATENT DOCUMENTS

| | | |
|---|---|---|
| 2017/0199136 A1 | 7/2017 | Krokhmal et al. |
| 2017/0234814 A1* | 8/2017 | Ogata ................ G01N 23/2206 378/44 |
| 2017/0307548 A1 | 10/2017 | Bykanov et al. |
| 2018/0113084 A1 | 4/2018 | Hench et al. |
| 2018/0149603 A1 | 5/2018 | Bhattacharyya et al. |
| 2018/0328868 A1 | 11/2018 | Bykanov et al. |
| 2019/0227005 A1 | 7/2019 | Ogata et al. |
| 2019/0227006 A1 | 7/2019 | Ogata et al. |

FOREIGN PATENT DOCUMENTS

| | | |
|---|---|---|
| JP | 2005-221363 A | 8/2005 |
| JP | 2017-125848 A | 7/2017 |
| TW | 201807407 A | 3/2018 |
| TW | 201833539 A | 9/2018 |
| TW | 201907155 A | 2/2019 |
| WO | 2007/026461 A1 | 3/2007 |
| WO | 2018/016430 A1 | 1/2018 |

OTHER PUBLICATIONS

Office Action dated Oct. 5, 2022, issued in counterpart CN application No. 109105789. (8 pages).

* cited by examiner

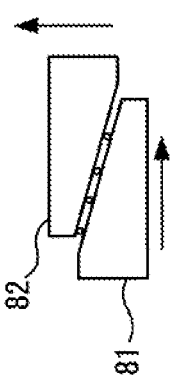
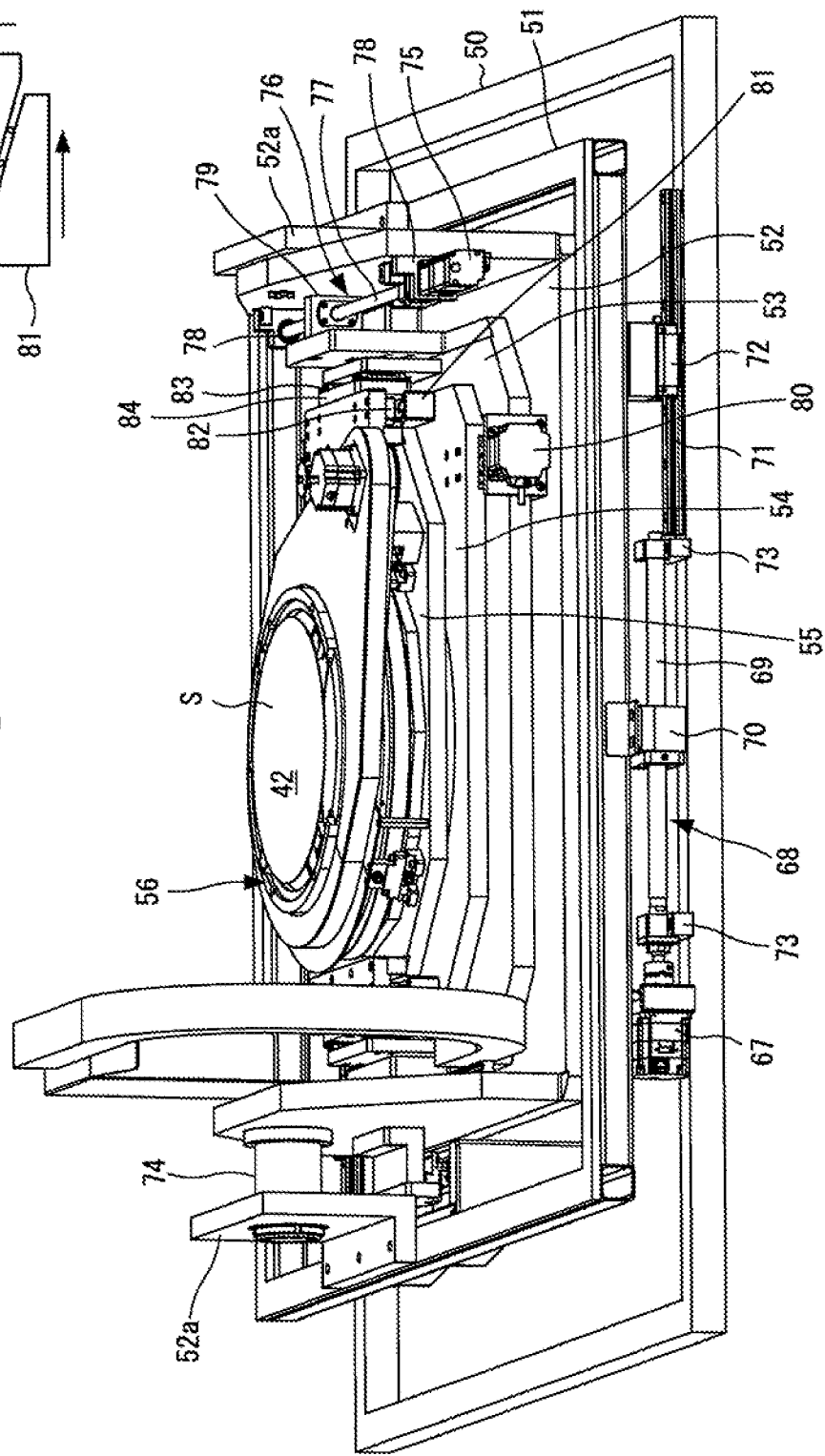

TRANSMISSIVE SMALL-ANGLE SCATTERING DEVICE

TECHNICAL FIELD

The present invention relates to, for example, a transmission type small-angle X-ray scattering (T-SAXS) device capable of non-destructively measuring a semiconductor device on a semiconductor manufacturing process site.

BACKGROUND ART

High densification, multilayering, and complication of circuit patterns have been progressing for recent semiconductor devices in order to improve the performance of the semiconductor devices. Particularly, in NAND flash memories having three-dimensional structures (3D-NAND), multilayering is progressing as the capacitance density increases, and as a result, such structures have pillars having large aspect ratios (diameter: several tens to several hundreds nm, height: several μm) or trenches (deep grooves).

Conventionally, an optical critical dimension (OCD) device has been mainly used to measure the three-dimensional structure of a semiconductor device, but there has occurred a situation in which the above-mentioned complicated structure cannot be measured by the device. If a scanning electron microscope (SEM) or a transmission electron microscope (TEM) is used, it would be possible to perform measurement in the depth direction. However, since the measurement by these electron microscopes is based on a measurement method for performing the measurement by destroying a measurement target, a semiconductor device which has been manufactured in the semiconductor manufacturing process cannot be non-destructively measured on site.

In recent years, analytical instrument manufacturers have been developing transmission type small-angle scattering devices as disclosed in Patent Literature 1 for the purpose of applying them to structural measurement of semiconductor devices, but these devices have not yet been put into practical use under the present circumstances.

CITATION LIST

Patent Literature

Patent Literature 1: Japanese Patent Laid-Open No. 2017-125848

SUMMARY OF INVENTION

Technical Problem

The present invention has been made in view of the above circumstances, and has an object to provide a transmission type small-angle scattering device that can non-destructively and efficiently measure even a fine shape of a semiconductor device having a complicated structure on a manufacturing process site.

Solution to Problem

A transmission type small-angle scattering device according to the present invention comprises: a sample holder in which a sample as an inspection target is placed; a sample positioning mechanism for moving the sample holder; a goniometer including a rotation arm; an X-ray irradiation unit installed on the rotation arm; and a two-dimensional X-ray detector installed on the rotation arm. The rotation arm is freely turnable around a θ-axis extending in a horizontal direction from an origin with a vertical arrangement state of the rotation arm being defined as the origin; the X-ray irradiation unit is installed on a lower-side end portion of the rotation arm; the two-dimensional X-ray detector is installed on an upper-side end portion of the rotation arm; the X-ray irradiation unit irradiates the sample placed in the sample holder with focused X-rays from a lower side of the sample; and the two-dimensional X-ray detector detects scatter X-rays generated around the focused X-rays transmitted through the sample at a position above the sample.

Such a vertical arrangement structure makes it possible to install the transmission type small-angle scattering device even on a floor surface having a relatively small area.

Here, the rotation arm may comprise a plurality of arm members, and may be configured so that one of the plurality of arm members is fixed to a θ rotation axis of the goniometer, and the other arm members slide with respect to the arm member fixed to the θ rotation axis to overlap and fit the fixed arm member.

By folding up the respective arm members as described above, the total length can be shortened and a compact form can be obtained.

Further, the sample holder may be formed inside a sample holding frame, the inside of the sample holding frame may serve as an X-ray transmission hole, and the sample holder may be configured to support the sample while facing the X-ray transmission hole.

Still further, suction support pieces may be provided on an inner peripheral edge of the sample holding frame so as to protrude inward from a plurality of places of the inner peripheral edge, and configured to suck and support a part of an outer peripheral edge portion of the sample.

Such a configuration makes it possible to support the sample without touching a wide region of the back surface of the sample.

In addition, since almost the entire region of the sample except for some minute regions supported by the suction support pieces can be irradiated with X-rays from the X-ray irradiation unit through the X-ray transmission hole, a wide measurable region can be secured.

The sample positioning mechanism may include an in-plane rotation mechanism for causing the sample supported by the sample holder to rotate within a plane, a Y-axis moving mechanism for moving the sample holder in a longitudinal direction, an X-axis moving mechanism for moving the sample holder in a lateral direction, a Z-axis moving mechanism for moving the sample holder in a vertical direction, and a swing mechanism for swinging the sample holder, the Z-axis moving mechanism may include a guide member and a sliding member which are combined with each other in a wedge-like shape and configured so that the sliding member is pushed up when the guide member moves in one direction, whereas the sliding member is descended when the guide member moves in an opposite direction. The sample holder moves in the vertical direction together with the sliding member.

According to this configuration, since the sliding contact state is always maintained without rattling between the guide member and the sliding member which are combined with each other in a wedge-like shape, the sample holder can be accurately moved in the vertical direction and positioned at a desired height position.

The transmission type small-angle scattering device may further comprise an external housing for covering the periphery of the transmission type small-angle scattering device. The external housing may include a housing main body and one or a plurality of housing element members, the housing element members may be freely movable in a vertical direction with respect to the housing main body, and the housing element members may be configured to be capable of setting a form in which the housing element members are overlapped with the housing main body and folded up, and a form in which the housing element members are protracted from the housing main body.

By setting the state where the housing element members are overlapped with the housing main body and folded up, a compact form having a small height dimension can be set, and a transportation work and an installation work of the external housing can be extremely easily performed.

As described above, according to the present invention, the X-ray irradiation unit and the two-dimensional X-ray detector are installed on the rotation arm of the goniometer to form a vertical arrangement structure, so that the transmission type small-angle scattering device can be installed even on a floor having a relatively small area. As a result, even a fine shape of a semiconductor device having a complicated structure can be measured nondestructively and efficiently on site in the manufacturing process.

BRIEF DESCRIPTION OF DRAWINGS

FIG. 10A is a perspective view showing an X-axis moving mechanism, a Y-axis moving mechanism, and a Z-axis moving mechanism. FIG. 10B is a configuration diagram schematically showing a guide member and a sliding member.

REFERENCE SIGNS LIST

Figure 1A:
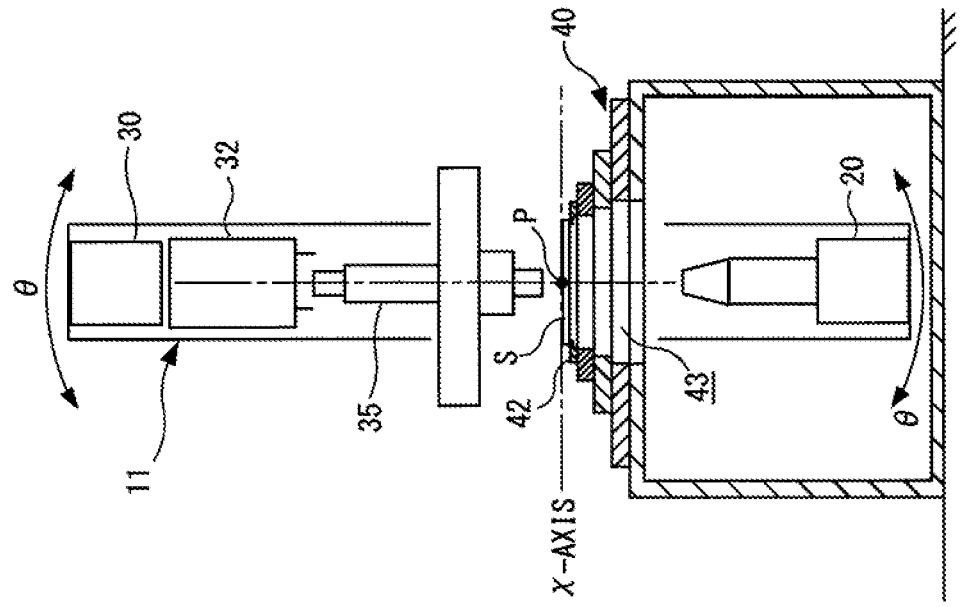
FIG. 1A is a side configuration diagram schematically showing an overall structure of a transmission type small-angle scattering device according to an embodiment of the present invention.

S: sample, P: measurement position,
10: goniometer, 11: rotation arm, 12: first arm member, 13: second arm member, 14: third arm member, 12a, 13a: guide rail, 15: lower holding member, 16: upper holding member, 17: support member, 20: X-ray irradiation unit, 21: X-ray tube, 22: focusing mirror, 23: aperture, 24: guard slit, 25: slit, 30: two-dimensional X-ray detector, 31: direct beam stopper, 32: vacuum path, 35: optical microscope, 36: laser inclination measuring device, 36a: laser light source, 36b: laser detector, 37: moving table, 40: sample stage, 41: frame body, 42: sample holder, 43: cavity, 50: base frame, 51: X-axis moving frame, 52: $\chi$-axis rotating table, 52a: bearing, 53: Y-axis moving table, 54: Z-axis driving table, 55: Z-axis moving table, 56: sample holding frame, 57: X-ray transmission hole, 58: suction support piece, 59: vacuum nozzle, 60: rotation guide portion, 61: rotation support portion, 62: support roller, 63: driven-side pulley, 64: in-plane rotation drive motor, 65: drive-side pulley, 66: drive belt, 67: X-axis drive motor, 68: ball screw, 69: screw shaft, 70: nut member, 71: guide rail, 72: slider, 73: bearing, 74: swing support shaft, 75: Y-axis drive motor, 76: ball screw, 77: screw shaft, 78: bearing, 79: nut member, 80: Z-axis drive motor, 81: guide member, 82: sliding member, 83: guide rail, 84: slider, 85: $\chi$-axis drive motor, 86: driving force transmission belt, 87: worm, 88: worm wheel, 89: drive-side pulley, 90: driven-side pulley, 91: guide rail, 92: slider, 93: guide rail, 94: slider, 95: ball screw, 96: nut member, 100: central processing unit, 101: X-ray irradiation controller, 102: image recognition circuit, 103: focus controller, 104: positioning controller, 105: goniometer controller, 106: storage unit, 107: detection control circuit, 110: sample positioning mechanism, 200: external housing, 201: housing main body, 202, 203: housing element member, 210, 211: guide rail, 220: shielding panel, 300: fan filter unit, 310: substrate feeding device (EFEM), 320: electrical component portion

DESCRIPTION OF EMBODIMENTS

Hereinafter, an embodiment of the present invention will be described in detail with reference to the drawings.
[Overview]

First, an outline of a transmission type small-angle scattering device according to an embodiment of the present invention will be described.

When a sample is irradiated with an X-ray beam, X-rays are scattered in a small angle region (small angle region) near a traveling direction of the X-ray beam. This scattering is called small-angle scattering, and a particle size, a periodic structure, etc. relating to a substance can be known by measuring the small-angle scattering. Further, in recent years, development of an analysis method for obtaining various information on thin films forming semiconductor devices by this small-angle scattering measurement has been promoted.

A device for measuring this small-angle scattering is a small-angle scattering device.

As the small-angle scattering device are known a reflection type small-angle scattering device for irradiating the surface of a sample with X-rays and detecting scatter X-rays reflected from the surface of the sample, and a transmission type small-angle scattering device for irradiating the back surface of a sample with X-rays and detecting scatter X-rays emitted from the front surface of the sample.

The present invention relates to a transmission type small-angle scattering device. This transmission type small-angle scattering device has a basic structure in which an X-ray source and a two-dimensional X-ray detector are arranged so as to face each other with interposing a sample therebetween, the back surface of the sample is irradiated with X-rays from the X-ray source, and scatter X-rays radiated from the front surface of the sample at a specific angle are detected by a two-dimensional X-ray detector.

Conventionally, a general small-angle scattering device has a horizontal layout structure in which an X-ray source and a two-dimensional X-ray detector are horizontally arranged, so that it needs a large installation area.

On the other hand, the transmission type small-angle scattering device according to the present embodiment can be installed on a floor surface having a limited area in a clean room where a semiconductor manufacturing line is constructed, so that the transmission type small-angle scattering device has a vertical layout structure in which the X-ray source and the two-dimensional X-rays detector are arranged vertically.
[Overall Structure]

Figure 1B:
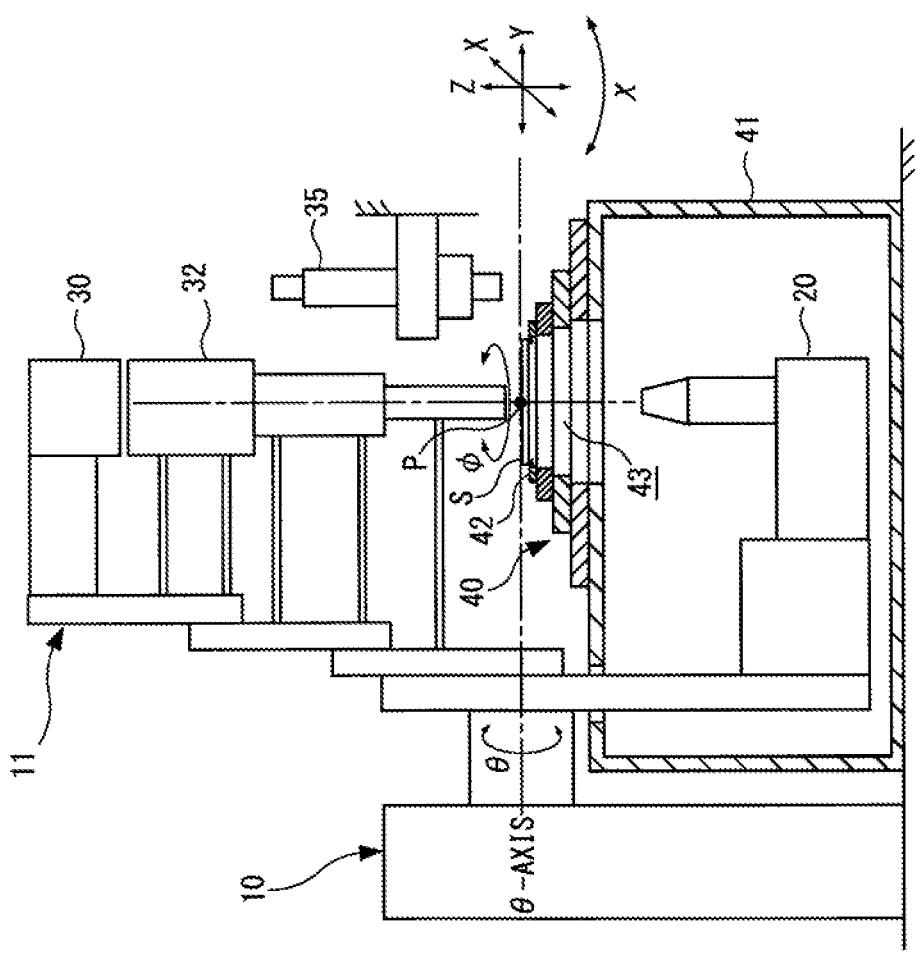
FIG. 1B is also a front configuration diagram.
Figure 2:
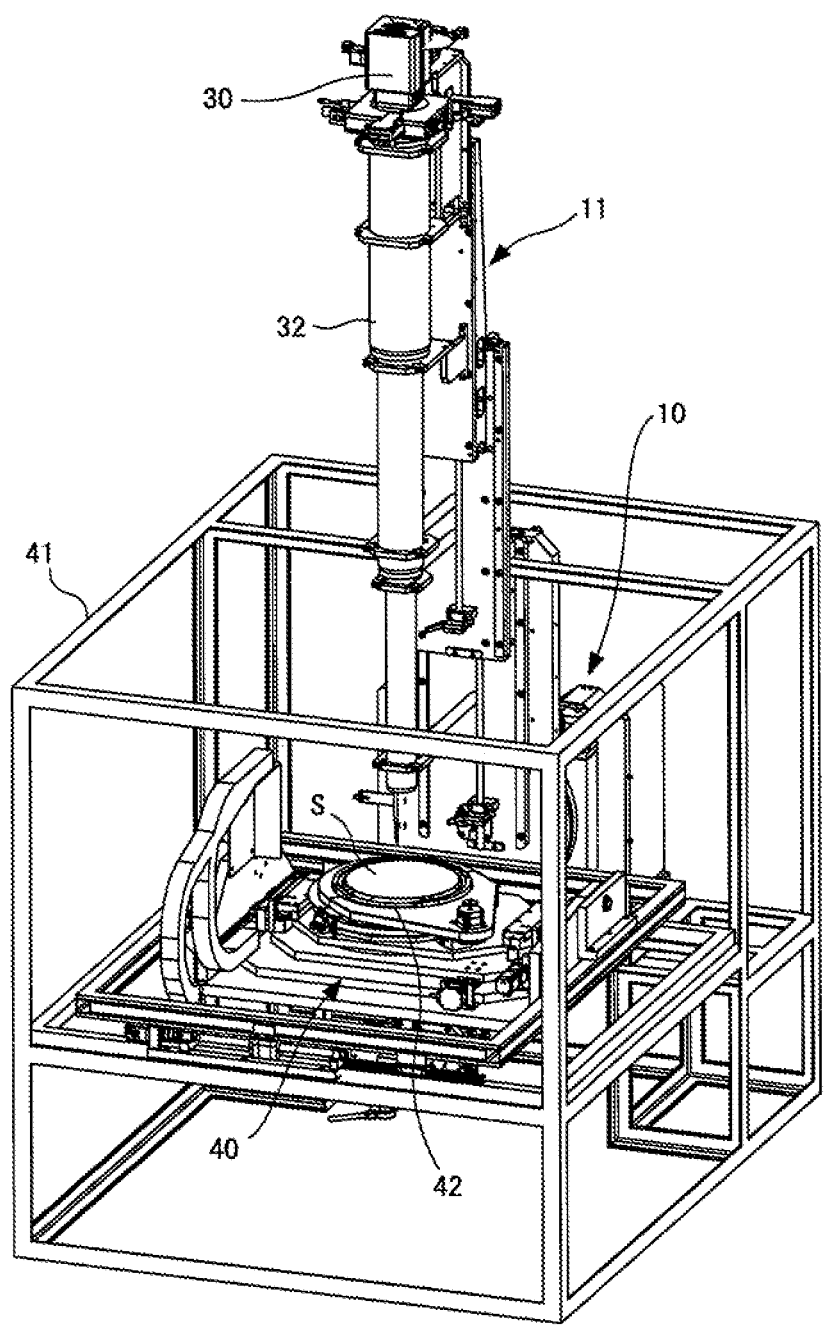
FIG. 2 is a perspective view showing the appearance of the transmission type small-angle scattering device according to the embodiment of the present invention.
Figure 3:
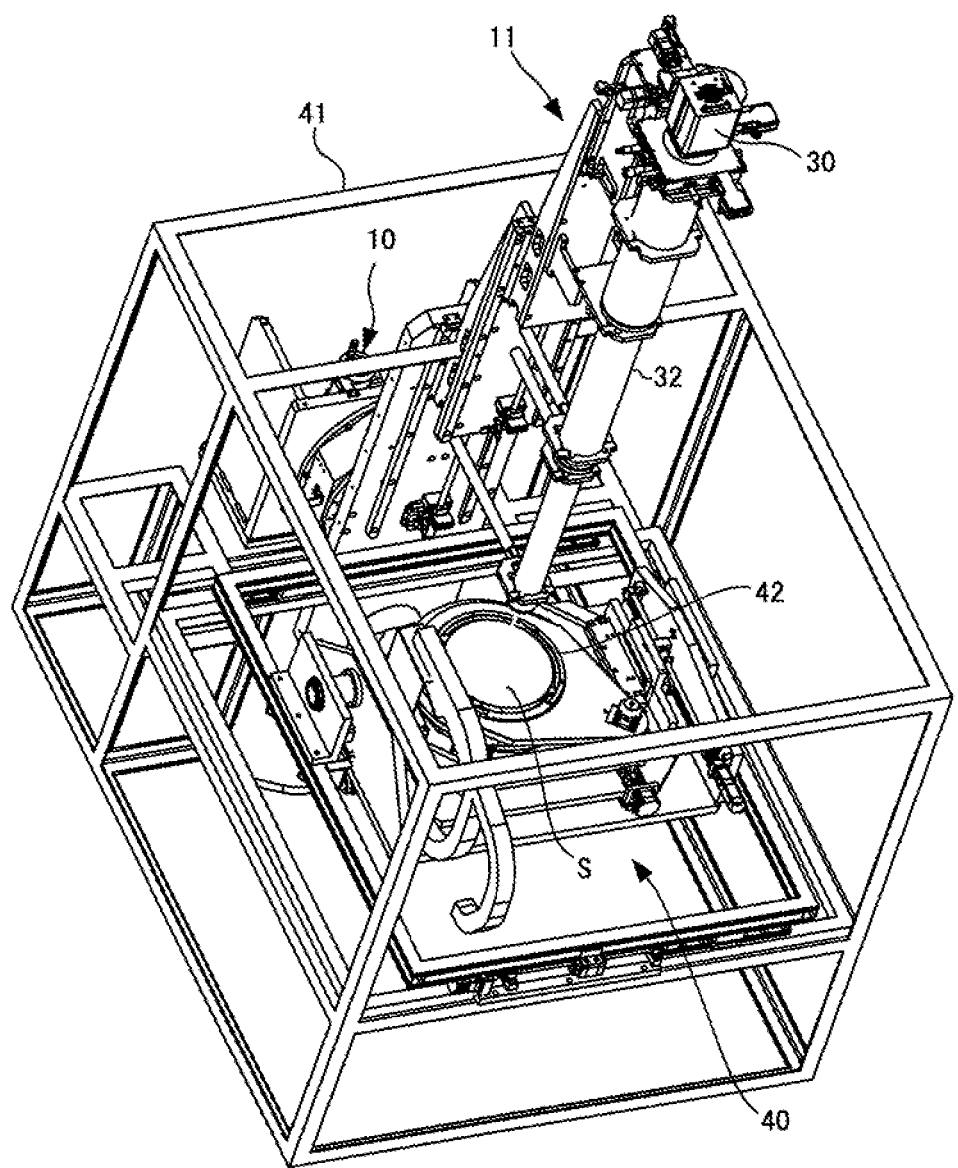
FIG. 3 is a perspective view showing the appearance of the transmission type small-angle scattering device according to the embodiment of the present invention when viewed from a direction different from that of FIG. 2.

FIG. 1A is a side configuration diagram schematically showing the overall structure of the transmission type small-angle scattering device according to the embodiment of the present invention, and FIG. 1B is also a front configuration diagram. FIGS. 2 and 3 are perspective views of the appearance of the transmission type small-angle scattering device when viewed from different directions.

The transmission type small-angle scattering device according to the present embodiment includes a goniometer 10. The goniometer 10 has a function of rotationally driving a rotation arm 11 around a θ-axis extending in a horizontal direction. The rotation arm 11 includes an X-ray irradiation unit 20 and a two-dimensional X-ray detector 30 which are installed at both end portions thereof. Here, a vertical arrangement state in which the rotation arm 11 is vertically arranged is defined as an origin. The X-ray irradiation unit 20 is installed at a lower end portion, and the two-dimensional X-ray detector 30 is installed at an upper end portion. Such a vertical arrangement structure enables the transmission type small-angle scattering device to be installed even on a floor surface having a relatively small area.

The X-ray irradiation unit 20 and the two-dimensional X-ray detector 30 are arranged so as to face each other with interposing a sample stage 40 therebetween, and configured so that the X-ray irradiation unit 20 irradiates a sample S supported by a sample holder 42 of the sample stage 40 with X-rays from the lower side of the sample S, and the two-dimensional X-ray detector 30 detects scatter X-rays generated in a minute angle region around the X-rays transmitted through the sample S.

Here, as shown in FIGS. 1A and 1B, a cavity 43 through which X-rays emitted from the X-ray irradiation unit 20 is transmitted is formed in the sample stage 40, and the back surface of the sample S is irradiated with X-rays through this cavity 43.

A cylindrical vacuum path 32 is installed in the rotation arm 11 of the goniometer 10. The vacuum path 32 has a function of eliminating air scattering occurring when X-rays transmitted through the sample S collide with air, thereby improving the measurement accuracy of small-angle scattering.

The sample stage 40 is configured so that it is driven by a sample positioning mechanism described later to move the sample holder 42 in a longitudinal direction (Y direction) and a lateral direction (X direction) parallel to the horizontal plane, and in a vertical direction (Z direction) perpendicular to the horizontal plane respectively, thereby positioning an inspection target point of the sample S at a measurement position P of the transmission type small-angle scattering device.

Further, the sample positioning mechanism has a function of causing the sample S supported by the sample holder 42 to perform in-plane rotation (φ-rotation). The sample positioning mechanism has also a function of causing the sample S supported by the sample holder 42 to swing around the χ-axis (χ-swing). This χ-axis intersects the θ-axis of the goniometer 10 at right angles in the horizontal plane. The intersection between the θ-axis and the χ-axis is positioned so as to match the measurement position P of the transmission type small-angle scattering device.

The sample stage 40 is supported by the frame body 41 as shown in FIGS. 2 and 3. The frame body 41 and the rotation arm 11 of the goniometer 10 are adjusted in mutual positional relation so as not to interfere with each other.

Further, the transmission type small-angle scattering device according to the present embodiment includes an optical microscope 35 for recognizing the surface of the sample S. The optical microscope 35 is installed at a position where it does not interfere with surrounding components such as parts driven by the sample positioning mechanism, the X-ray irradiation unit 20 and the two-dimensional X-ray detector 30 to be rotated by the goniometer 10.

The sample S can be moved to a lower position of the optical microscope 35 by the sample positioning mechanism.

[Rotation Arm of Goniometer and Components to be Installed in the Same Arm]

Next, the detailed configurations of the rotation arm of the goniometer and respective components to be installed in the rotation arm will be described mainly with reference to FIGS. 4 and 5.

Figure 4:
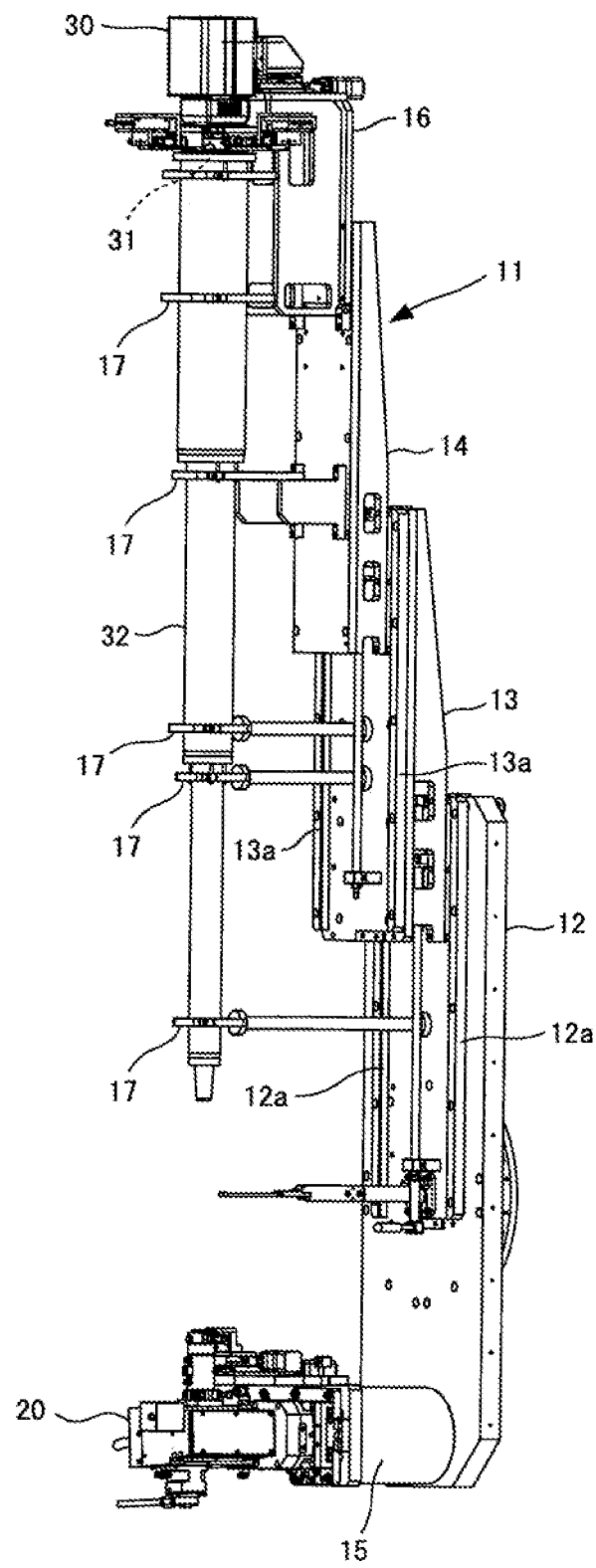
FIG. 4 is a perspective view showing the appearance of a rotation arm of a goniometer constituting the transmission type small-angle scattering device according to the embodiment of the present invention and components to be installed in the rotation arm.

FIG. 4 is a perspective view showing the appearance of the rotation arm of the goniometer constituting the transmission type small-angle scattering device according to the present embodiment and the components to be installed in the rotation arm. FIG. 5 is a perspective view showing a state in which the rotation arm of the goniometer shown in FIG. 4 is folded to shorten the total length.

The rotation arm 11 of the goniometer 10 includes a plurality of arm members. The rotation arm 11 of the present embodiment shown in FIGS. 4 and 5 includes first, second, and third arm members 12, 13, and 14, and the first arm member 12 is fixed to a θ-rotation shaft (θ-axis in FIG. 1A) of the goniometer 10.

Figure 5:
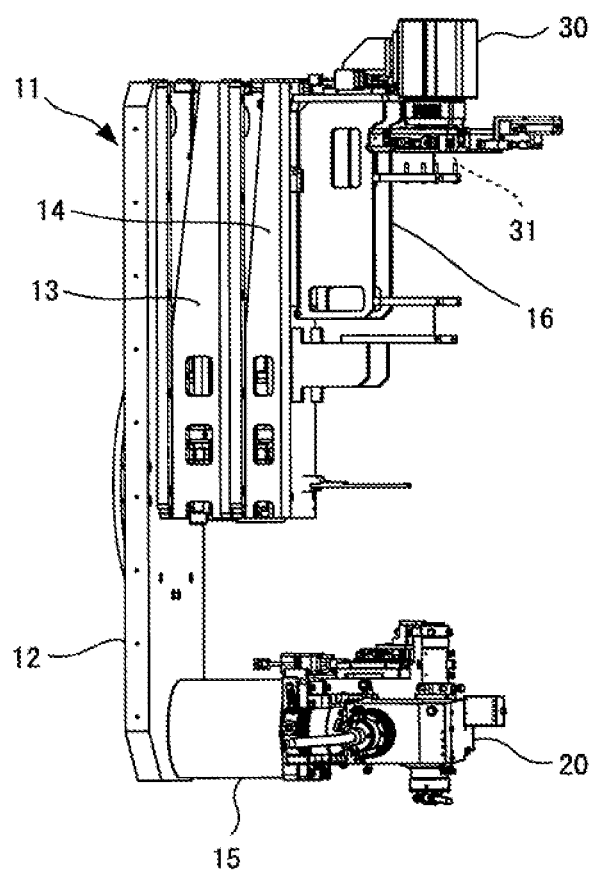
FIG. 5 is a perspective view showing a state in which the rotation arm of the goniometer shown in FIG. 4 is folded to shorten the total length.

The rotation arm 11 of the goniometer 10 is configured so that the second arm member 13 slides in the longitudinal direction with respect to the first arm member 12, and the third arm member 14 slides in the longitudinal direction with respect to the second arm member 13, whereby the arm members 12, 13 and 14 are overlapped with and fitted to one another, whereby they are set to folded up as shown in FIG. 5.

By folding up the respective arm members 12, 13 and 14 as described above, the total length can be shortened and the rotation arm 11 can be arranged in a compact form.

By arranging the rotation arm 11 in the compact form shown in FIG. 5, a transportation work and an installation work on site can be extremely easily performed, and it is possible to realize shortening of work times required for these works and reduction of labors required for these works.

Specifically, a guide rail 12a is provided in the longitudinal direction on the surface of the first arm member 12, and the second arm member 13 is freely slidable along the guide rail 12a. Likewise, a guide rail 13a is provided in the longitudinal direction on the surface of the second arm member 13, and the third arm member 14 is freely slidable along the guide rail 13a.

The rotation arm 11 is provided with a lock mechanism (not shown) for keeping each of a state in which the respective arm members 12, 13, and 14 are unfolded to extend the total length as shown in FIG. 4 and a state in which the respective arm members 12, 13, and 14 are folded up to shorten the total length as shown in FIG. 5.

A lower holding member 15 for installing the X-ray irradiation unit 20 is provided at a lower end portion of the first arm member 12. The X-ray irradiation unit 20 is fixed to the lower holding member 15. The lower holding member 15 is incorporated with a slide mechanism (not shown) for moving and adjusting the fixed position of the X-ray irradiation unit 20 in the longitudinal direction.

Further, an upper holding member 16 for installing the two-dimensional X-ray detector 30 is provided at an upper end portion of the third arm member 14. The two-dimensional X-ray detector 30 is fixed to the upper holding member 16. The upper holding member 16 is also incorporated with a slide mechanism (not shown) for moving and adjusting the fixed position of the two-dimensional X-ray detector 30 in the longitudinal direction.

When installing the device on site, it is possible to install the device according to a preset specification by moving and adjusting the X-ray irradiation unit 20 and the two-dimensional X-ray detector 30.

Further, a direct beam stopper 31 is installed in front of the two-dimensional X-ray detector 30 on the upper holding member 16. The direct beam stopper 31 has a function of shielding X-rays that have passed through the sample S from the X-ray irradiation unit 20 and travelled straight, and preventing the X-rays from entering the two-dimensional X-ray detector 30.

As described above, the rotation arm 11 is also equipped with the vacuum path 32. Each of the arm members 12, 13 and 14 is provided with a support member 17 for supporting the vacuum path 32. The vacuum path 32 is supported by these support members 17 and is arranged on an optical path of X-rays that have passed through the sample S and scatter X-rays generated around the X-rays. The upper end surface of the vacuum path 32 is positioned in the vicinity of the two-dimensional X-ray detector 30.

The scatter X-rays that have passed through the sample S spread radially and reach the two-dimensional X-ray detector 30. Therefore, the vacuum path 32 is configured so that the diameter of a lower end surface thereof facing the sample S is reduced and the diameter thereof is stepwise increased toward an upper end surface thereof.

The inside of this vacuum path 32 is hermetically sealed to form a vacuum state therein, and both the end surfaces of the vacuum path 32 are formed of a material such as carbon, boron carbide, or Kapton, which has a small X-ray absorption rate. As a result, the vacuum path 32 can transmit therethrough the X-rays and scatter X-rays that have passed through the sample S, and prevent occurrence of air scattering.

[Optical System Including X-Ray Irradiation Unit and Two-Dimensional X-Ray Detector]

Figure 6:
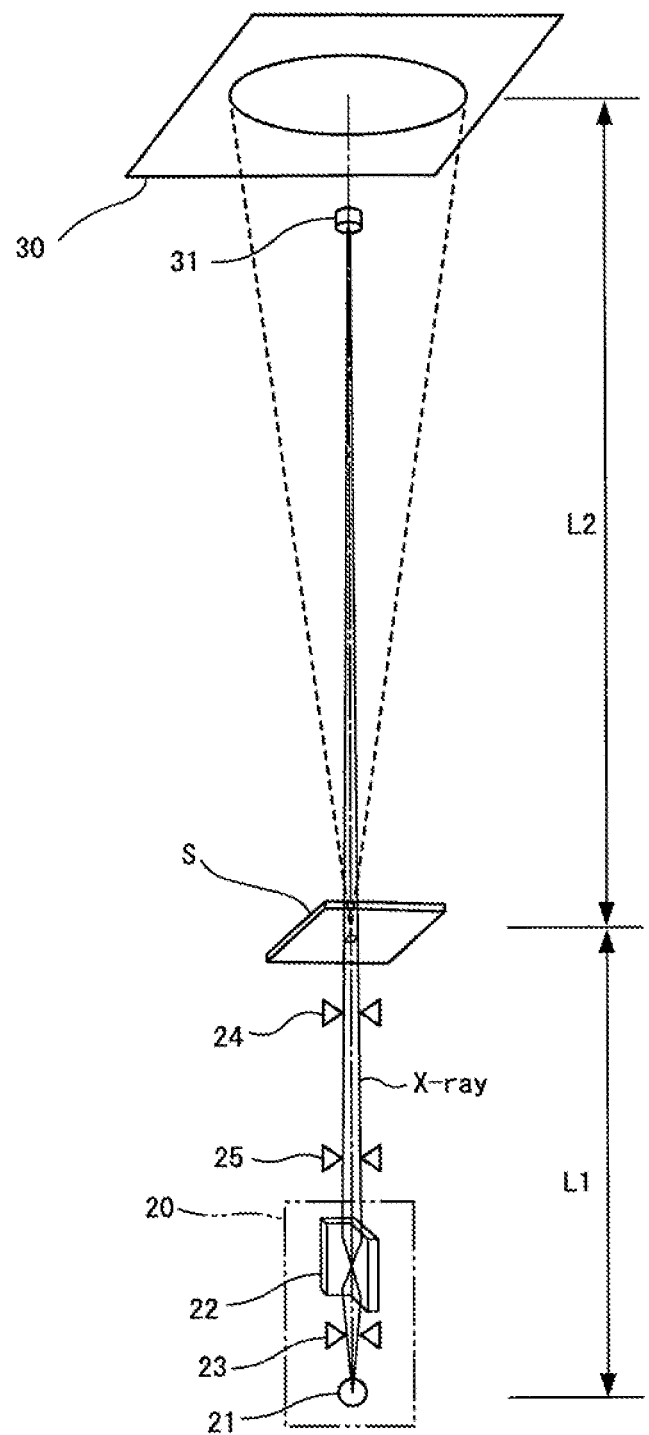
FIG. 6 is a diagram schematically showing an optical system configured between an X-ray irradiation unit and a two-dimensional X-ray detector.

FIG. 6 is a diagram schematically showing an optical system configured between the X-ray irradiation unit and the two-dimensional X-ray detector.

The X-ray irradiation unit 20 includes components such as an X-ray tube 21, a focusing mirror 22, and an aperture 23. Further, a guard slit 24 is arranged in front of the sample S.

As the X-ray tube 21 is used an X-ray tube in which the electron beam focal size on a target is equal to 70 μm or less, preferably 40 μm or less. Copper (Cu), molybdenum (Mo), silver (Ag), gold (Au) or the like can be selected as a target material, but in the case of the transmission type, high-energy X-rays capable of transmitting through an Si wafer which is the substrate are required, and thus it is desirable to use molybdenum (Mo) or silver (Ag) that meets this condition.

As the focusing mirror 22 may be adopted a side-by-side type focusing mirror 22 in which two multilayer mirrors each having a multilayer formed on the surface thereof are arranged in an L shape and integrated with each other. Further, a Kirkpatrick Baez type focusing mirror in which two multilayer mirrors are arranged independently of each other may be adopted.

The focusing mirror 22 is adjusted so as to focus on the detection surface of the two-dimensional X-ray detector 30, and has a function of focusing X-rays on a rectangular spot of 100 μm or less, preferably 50 μm or less lengthwise and breadthwise at the focal point.

The aperture 23 has a function of shielding leaked light generated when the X-rays emitted from the X-ray tube 21 are not incident to the focusing mirror 22 and pass to the outside as they are. The X-rays emitted from the X-ray tube 21 are passed through the aperture 23 while leaked light is shielded by the aperture 23, and then monochromatized and focused by the focusing mirror 22.

The guard slit 24 is a single crystal pinhole slit formed of a single crystal of germanium, and it is supported by a slit support member (not shown) provided on the rotation arm 11 and arranged in front of the sample S.

Normal slits have a disadvantage that when X-rays impinge on them, parasitic scattering occurs to intensify the background. On the other hand, the guard slit 24 formed of a single crystal of germanium can reduce parasitic scattering and suppress the background.

Note that a slit 25 for further reducing the cross-sectional area of X-rays may be arranged between the focusing mirror 22 and the guard slit 24.

The X-rays emitted from the X-ray tube 21 are incident to the focusing mirror 22 while shielding the leaked light by the aperture 23. Then, the X-rays that have been monochromatized and focused by the focusing mirror 22 are narrowed in cross-sectional area by the guard slit 24 and applied to an inspection point having a small area on the sample S.

Subsequently, the X-rays transmitted through the sample S and the scatter X-rays generated in a small angle region around the X-rays travel to the two-dimensional X-ray detector 30 through the vacuum path 32 shown in FIG. 4. Out of these X-rays, the X-rays that have passed through the sample S from the X-ray irradiation unit 20 and traveled straight are shielded by the direct beam stopper 31 provided in front of the two-dimensional X-ray detector 30. As a result, only the scatter X-rays generated in the small angle region of the X-rays are incident to the two-dimensional X-ray detector 30.

Here, the distance L1 from the focal point of the X-ray tube 21 to the sample S affects the focused area of the X-rays to be applied to the sample S. In other words, as the distance L1 is longer, the focused area of the X-rays to be applied to the sample S is smaller. Further, in the transmission type small-angle scattering device, the distance L2 from the sample S to the two-dimensional X-ray detector 30 is referred to as a camera length, and this camera length L2 affects the angular resolution of the two-dimensional X-ray detector 30. In other words, as the camera length L2 is longer, the angular resolution is more improved.

However, in the transmission type small-angle scattering device arranged vertically as in the present embodiment, there is a limit in securing a long distance L1 and a long camera length L2. Therefore, it is preferable that these dimensions are appropriately determined in comprehensive consideration of the environment at the site where the device is installed, the focused area of X-rays on the sample S, and the angular resolution.

As described above, the rotation arm 11 is configured so that the second arm member 13 slides in the longitudinal direction with respect to the first arm member 12, and the third arm member 14 slides in the longitudinal direction with respect to the second arm member 13. Therefore, the camera length L2 can be arbitrarily set by appropriately adjusting the respective slide positions of the sliding arm members 13 and 14.

Note that the rotation arm 11 may be provided with a position adjusting mechanism for moving the X-ray irradiation unit 20 in the optical axis direction of X-rays to arbitrarily change the distance L1. Further, a position adjusting mechanism for moving the two-dimensional X-ray detector 30 in the optical axis direction of X-rays to arbitrarily change the camera length L2 may be installed in the rotation arm 11.

[Sample Stage]

Next, the detailed structure of the sample stage will be described mainly with reference to FIGS. 7 to 12.

Figure 7:
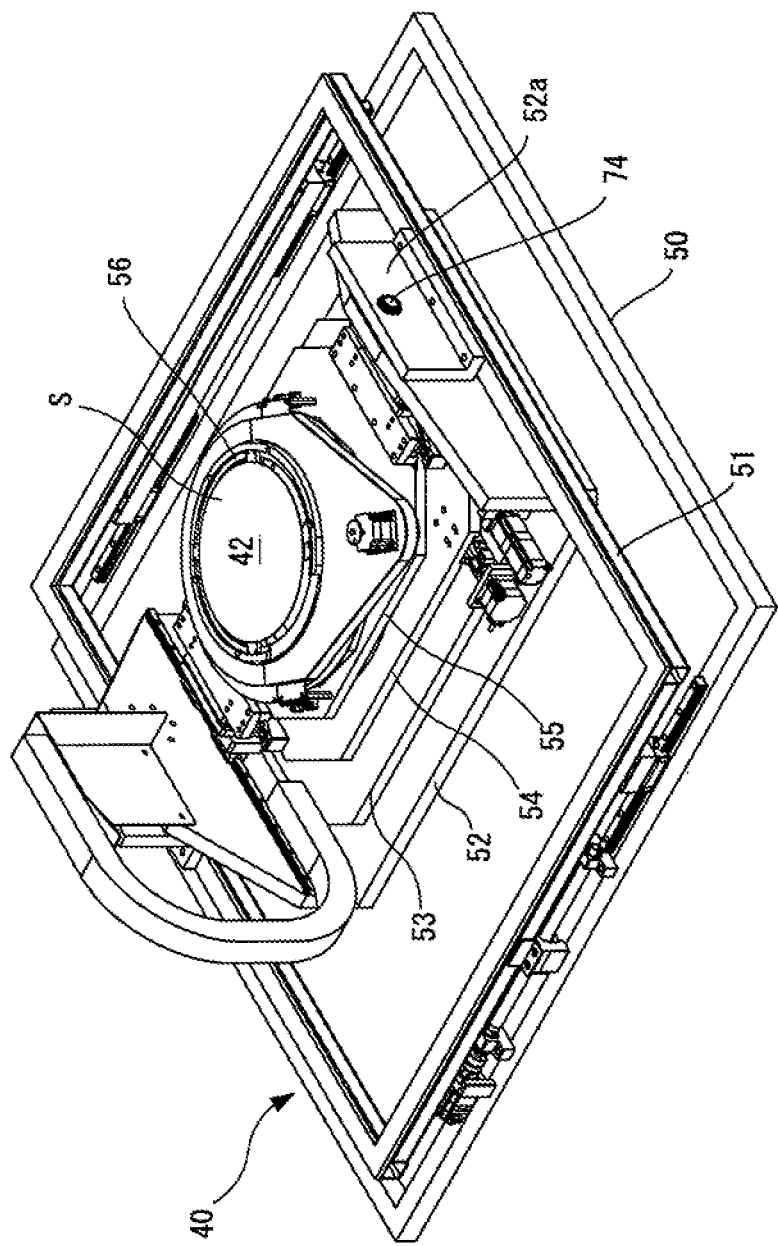
FIG. 7 is a perspective view showing the appearance of a sample stage constituting the transmission type small-angle scattering device according to the embodiment of the present invention.
Figure 8:
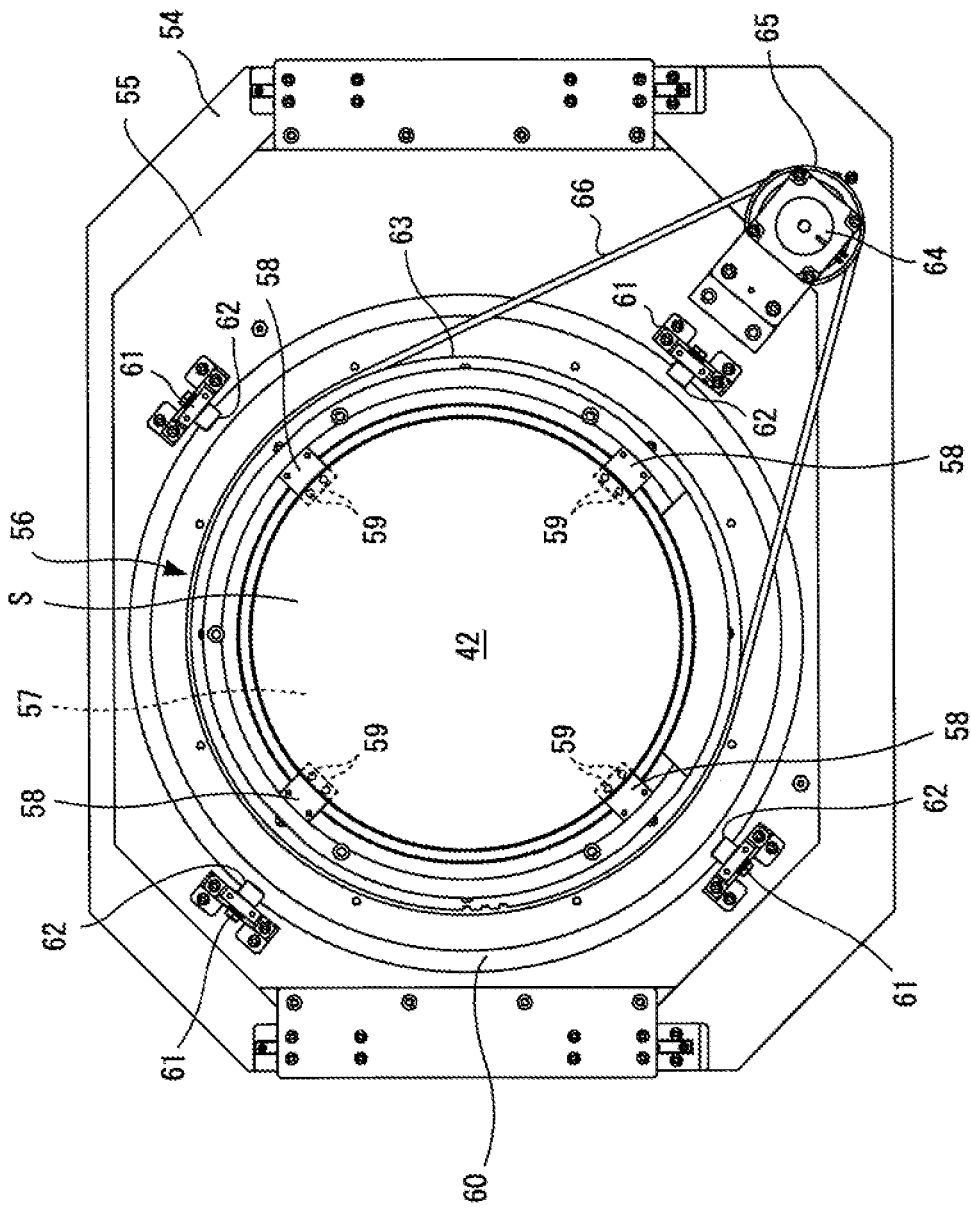
FIG. 8 is an enlarged plan view showing a sample holder for supporting a sample and an in-plane rotation mechanism.
Figure 9:
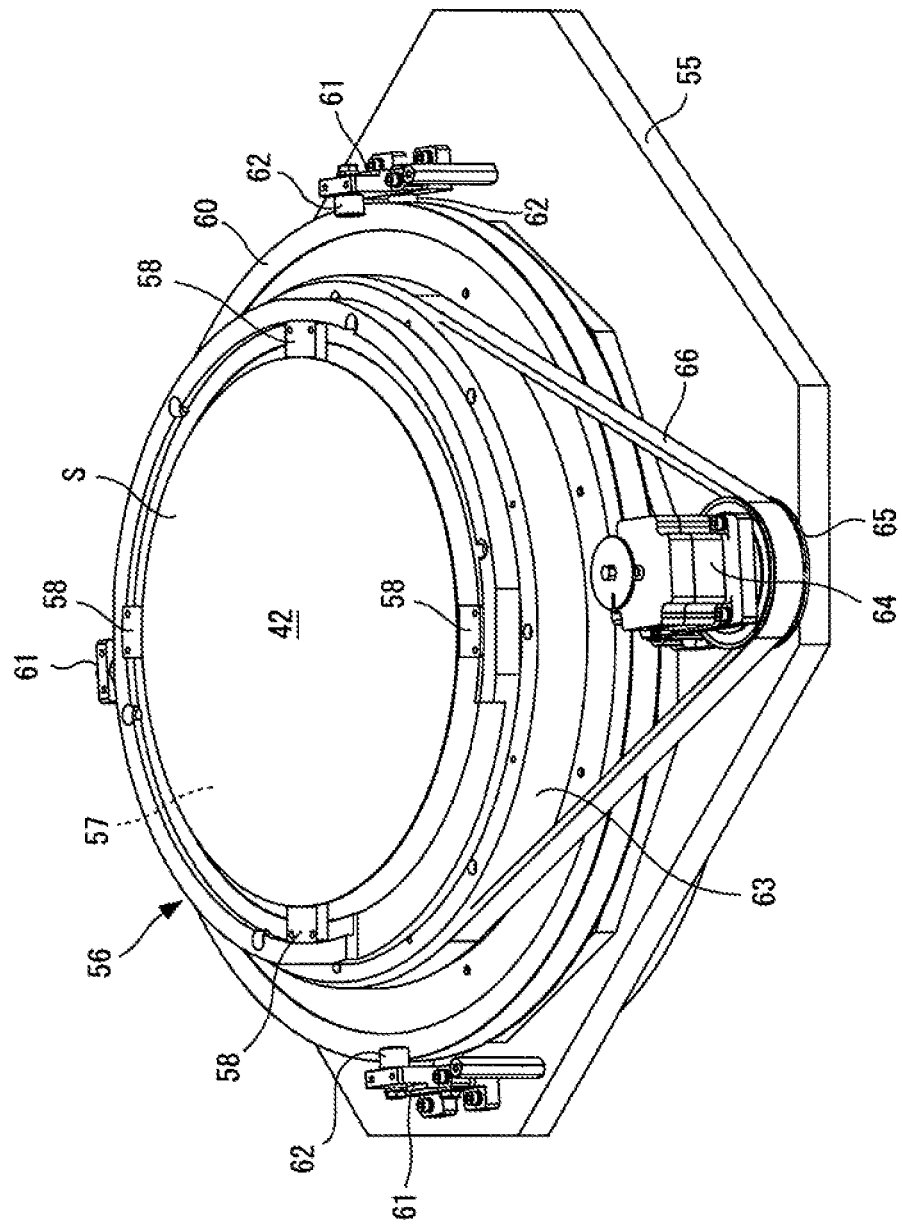
FIG. 9 is an enlarged perspective view showing the sample holder for supporting the sample and the in-plane rotation mechanism.
Figure 11:
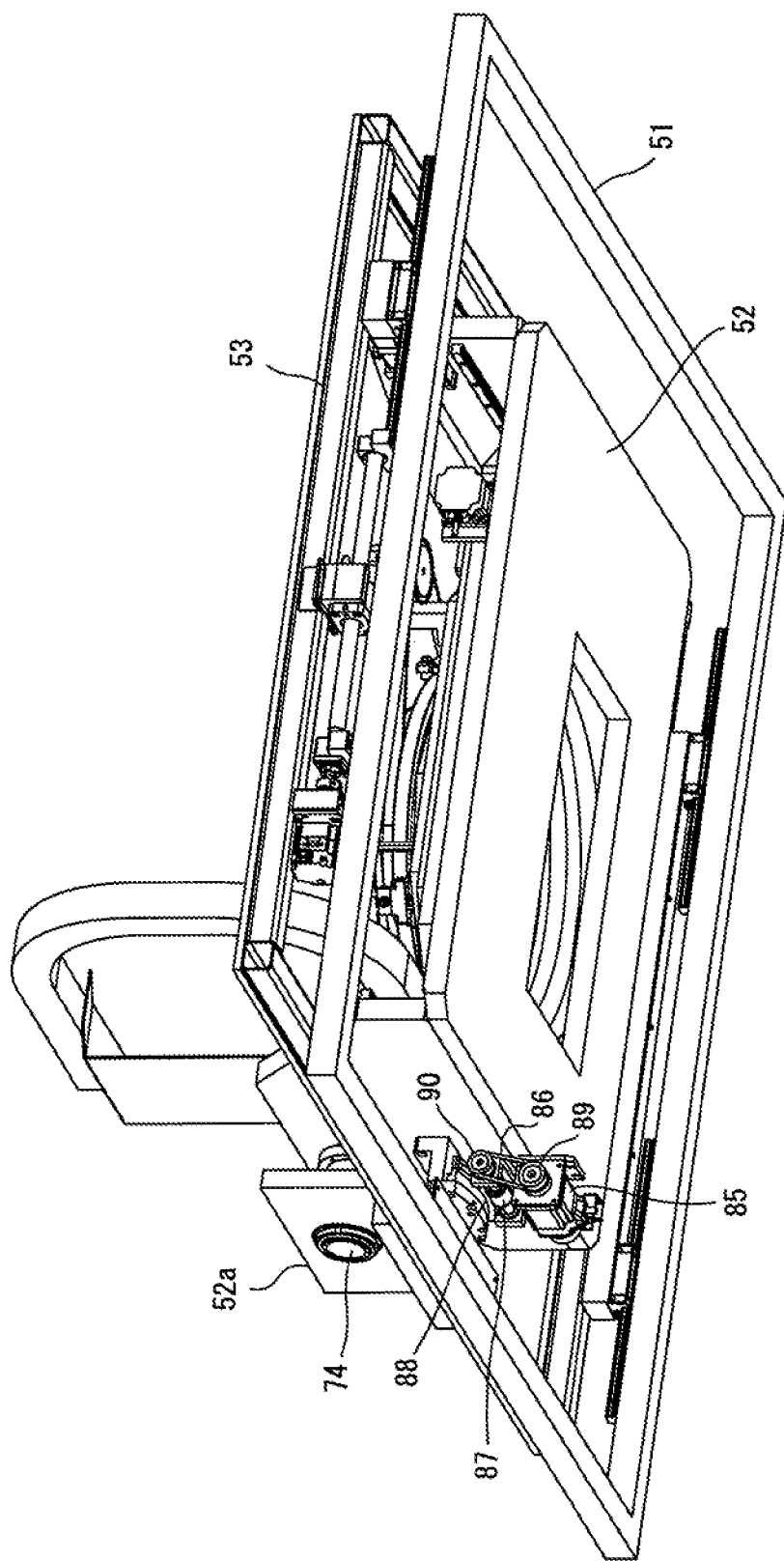
FIG. 11 is a perspective view showing a x-axis swing mechanism.
Figure 12:
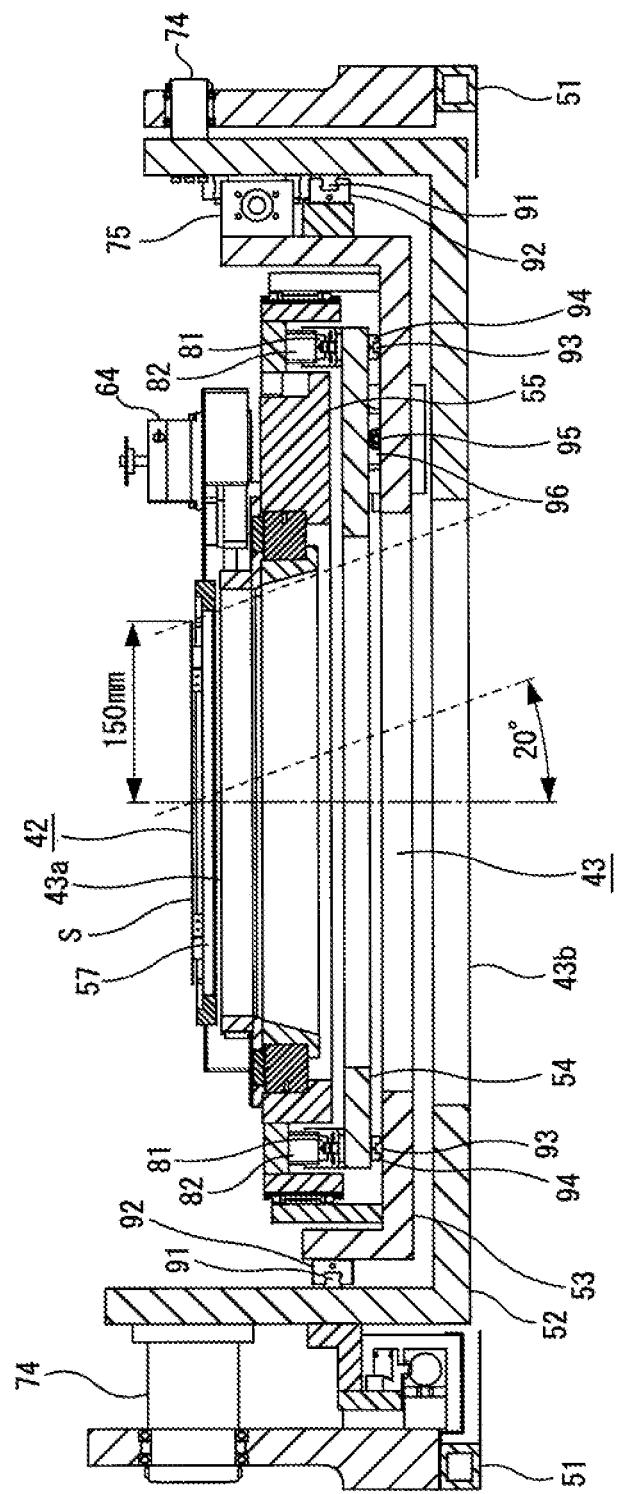
FIG. 12 is a longitudinally sectional view showing the sample stage.

FIG. 7 is a perspective view showing the appearance of the sample stage constituting the transmission type small-angle scattering device according to the present embodiment. FIG. 8 is an enlarged plan view showing the sample holder for supporting the sample, and FIGS. 9 to 11 are perspective views of different sites of the sample stage when the different sites are focused on in order to describe the sample positioning mechanism, and FIG. 12 is a longitudinally sectional view showing the sample stage.

As described above, the sample stage 40 includes the sample holder 42 for supporting the sample S and the sample positioning mechanism for driving the sample holder 42.

The sample positioning mechanism includes an in-plane rotation mechanism for causing the sample S supported by the sample holder 42 to perform in-plane rotation ((p-rotation), a Y-axis moving mechanism for moving the sample holder 42 in the longitudinal direction (Y-axis direction) parallel to the surface of the sample S supported by the sample holder 42, an X-axis moving mechanism for moving the sample holder 42 in the lateral direction (X-axis direction) parallel to the surface of the sample S supported by the sample holder 42, a Z-axis moving mechanism for moving the sample holder in the vertical direction (Z-axis direction) perpendicular to the surface of the sample S supported by the sample holder 42, and a $\chi$-axis swing mechanism for swinging the sample holder 42 around the $\chi$-axis.

Here, as shown in FIG. 7, the sample stage 40 is configured such that an X-axis moving frame 51 is installed on a base frame 50, a $\chi$-axis rotating table 52 is installed on the X-axis moving frame 51, a Y-axis moving table 53 is installed on the $\chi$-axis rotating table 52, a Z-axis driving table 54 and a Z-axis moving table 55 are installed on the Y-axis moving table 53, and a sample holding frame 56 forming the sample holder 42 is installed on the Z-axis moving table 55.

As shown in FIG. 8, the sample holder 42 is formed inside a circular sample holding frame 56. The inside of the sample holding frame 56 serves as an X-ray transmission hole 57, and is configured so as to support the sample S in a state where the sample S faces the X-ray transmission hole 57. Suction support pieces 58 are provided on the inner peripheral edge of the sample holding frame 56 so as to protrude inward from a plurality of locations (4 locations in the figure).

A part of the outer peripheral edge portion of the sample S is placed on the upper surfaces of the suction support pieces 58, and vacuum-sucked onto the upper surfaces of the suction support pieces 58. Note that a vacuum nozzle 59 is opened on the upper surface of each suction support piece 58, and the vacuum nozzles 59 are vacuum-sucked by a vacuum suction device (not shown).

The X-ray transmission hole 57 formed inside the sample holding frame 56 communicates with the cavity 43 of the sample stage 40 shown in FIGS. 1A and 1B (see FIG. 12). The X-rays emitted from the X-ray irradiation unit 20 are passed through the X-ray transmission hole 57 from the cavity 43, and applied to the back surface of the sample S supported by the suction support pieces 58.

The conventional X-ray inspection device has a general configuration in which the sample holder 42 is formed of a material having a low X-ray absorption rate such as Kapton, and the entire back surface of the sample S is arranged in close contact with the upper surface of the sample holder 42. However, for example, when a semiconductor device formed on a semiconductor wafer is an inspection target, the back surface of the semiconductor wafer may come into contact with the sample holder 42 formed of a material such as Kapton, and be contaminated.

According to the sample holder 42 of the present embodiment, with respect to the back surface of the sample S, only a limited part of the outer peripheral edge thereof is in contact with the suction support pieces 58, so that the sample S can be supported without touching a central portion of a semiconductor wafer on which a circuit pattern is formed.

In addition, almost the entire region of the sample S except for partial minute regions supported by the suction support pieces 58 can be irradiated with X-rays from the X-ray irradiation unit 20 through the cavity 43 and the X-ray transmission hole 57, so that a wide measurable region can be secured. With respect to the partial minute regions supported by the suction support pieces 58, the partial minute regions can be also irradiated with X-rays by changing the suction positions thereof with a sample S transport robot.

Next, the in-plane rotation mechanism will be described in detail mainly with reference to FIGS. 8 and 9.

The sample holding frame 56 constituting the sample holder 42 has a rotation guide portion 60 formed at a circular outer peripheral edge portion thereof, and the rotation guide portion 60 is supported so as to be freely rotatable within a plane by rotation support portions 61 which are provided at a plurality of locations (four locations in the figure) on the upper surface of the Z-axis moving table 55. Each rotation support portion 61 supports the rotation guide portion 60 from the upper and lower sides by a pair of upper and lower support rollers 62.

A driven-side pulley 63 is formed on the sample holding frame 56. Further, an in-plane rotation drive motor 64 is installed on the Z-axis moving table 55, and a drive belt 66 is looped between a drive-side pulley 65 provided on a drive shaft of the in-plane rotation drive motor 64 and the driven-side pulley 63 of the sample holding frame 56.

The in-plane rotation mechanism is configured by these components of the rotation guide portion 60, the rotation support portions 61, the in-plane rotation drive motor 64, the drive-side pulley 65, the driven-side pulley 63, and the drive belt 66. In other words, the rotational driving force from the in-plane rotation drive motor 64 is transmitted to the sample holding frame 56 via the drive belt 66. The rotation driving force causes the sample holding frame 56 supported by the rotation support portions 61 to rotate within a plane.

Next, the X-axis moving mechanism, the Y-axis moving mechanism, and the Z-axis moving mechanism will be described in detail mainly with reference to FIG. 10A.

The X-axis moving frame 51 is installed on the base frame 50 via the X-axis moving mechanism.

The X-axis moving mechanism includes an X-axis drive motor 67, a ball screw 68, guide rails 71, and sliders 72.

The X-axis drive motor 67, a screw shaft 69 of the ball screw 68, and the guide rail 71 are installed on the base frame 50.

The guide rails 71 extend in the X-axis direction, and the sliders 72 are freely movable along the guide rails 71. The guide rail 71 is installed at each of both end portions of the base frame 50, and the sliders 72 which are combined with the respective guide rails 71 support the X-axis moving frame 51 so as to be freely movable.

The screw shaft 69 of the ball screw 68 is freely rotatably supported by a bearing 73 provided on the base frame 50, and extends in the X-axis direction. The screw shaft 69 is connected to a rotary drive shaft of the X-axis drive motor 67, and is rotationally driven by the rotational driving force of the motor 67.

A nut member 70 is engaged with the screw shaft 69, and the nut member 70 moves in the X-axis direction as the screw shaft 69 rotates. The nut member 70 is fixed to the X-axis moving frame 51, and the X-axis moving frame 51 moves integrally with the nut member 70 in the X-axis direction.

As shown in FIGS. 10A and 7, the X-axis moving frame 51 is provided with a pair of bearings 52a at both end portions thereof, and the χ-axis rotating table 52 is installed so as to be freely swingable via swing support shafts 74 which are freely swingably supported by these bearings 52a. The Y-axis moving table 53 is installed on the χ-axis rotating table 52 via the Y-axis moving mechanism.

The Y-axis moving mechanism includes a Y-axis drive motor 75, a ball screw 76, and guide rails 91 and sliders 92 shown in FIG. 12. The guide rail 91 is provided at each of both end portions of the χ-axis rotating table 52, and extends in the Y-axis direction. The slider 92 is freely movably combined with each guide rail 91, and the Y-axis moving table 53 is supported by these sliders 92.

The Y-axis drive motor 75 and a screw shaft 77 of the ball screw 76 are installed on the side wall of the χ-axis rotating table 52. The screw shaft 77 of the ball screw 76 is freely rotatably supported by a bearing 78 provided on the side wall of the χ-axis rotating table 52, and extends in the Y-axis direction. The screw shaft 77 is connected to the rotational drive shaft of the Y-axis drive motor 75, and is rotationally driven by the rotational driving force of the motor 75.

A nut member 79 is engaged with the screw shaft 77, and the nut member 79 moves in the Y-axis direction as the screw shaft 77 rotates. The nut member 79 is fixed to the Y-axis moving table 53, and the Y-axis moving table 53 moves integrally with the nut member 79 in the Y-axis direction.

Further, the Z-axis driving table 54 is installed on the Y-axis moving table 53.

Guide rails 93 extending in the Y-axis direction are installed on the Y-axis moving table 53, and sliders 94 are combined with the guide rails 93 (see FIG. 12). The Z-axis driving table 54 is installed on the Y-axis moving table 53 while supported by the sliders 94.

Further, a ball screw 95 shown in FIG. 12 and a Z-axis drive motor 80 shown in FIG. 10A are installed on the Y-axis moving table 53, and a screw shaft of the ball screw 95 is connected to the rotational drive shaft of the motor 80. The screw shaft is freely rotatably supported on the Y-axis moving table 53 by a bearing (not shown).

The nut member 96 shown in FIG. 12 is engaged with the screw shaft, and the nut member 96 moves in the Y-axis direction as the screw shaft rotates. The nut member 96 is fixed to the Z-axis driving table 54, and the Z-axis driving table 54 moves integrally with the nut member 96 in the Y-axis direction.

The Z-axis moving table 55 is supported on the Z-axis driving table 54 via guide members 81 and sliding members 82 that are combined in a wedge-like shape as shown in FIG. 10B.

The guide member 81 is installed at each of both end portions of the Z-axis driving table 54. The sliding members 82 which are respectively combined with the guide members 81 are fixed to the bottom surface of the Z-axis moving table 55.

Guide rails 83 extending in the Z-axis direction are installed at both end portions of the Y-axis moving table 53, and sliders 84 which are combined with the guide rails 83 are fixed to the Z-axis moving table 55. As a result, the Z-axis moving table 55 is freely movable in the Z-axis direction integrally with the sliders 84 along the guide rails 83.

When the Z-axis driving table 54 moves in one direction of the Y-axis upon reception of the rotational driving force of the Z-axis drive motor 80, the guide members 81 also move integrally in the same direction. Along with this movement, the sliding members 82 which are combined with the guide members 81 in the wedge-like shape are pushed up in the Z-axis direction. Further, when the Z-axis driving table 54 moves in the opposite direction, the guide members also move integrally in the same direction, and the sliding members 82 which are combined with the guide members 81 in the wedge-like shape descend. As a result, the Z-axis moving table 55 moves in the vertical direction along the guide rails 83.

Since the guide member 81 and the sliding member 82 which are combined with each other in the wedge-like shape are always kept in a sliding contact state without rattling, the sample holder 42 can be accurately moved in the vertical direction and positioned to a desired height position.

Next, the χ-axis swing mechanism will be described in detail mainly with reference to FIG. 11.

The χ-axis swing mechanism is incorporated between the X-axis moving frame 51 and the χ-axis rotating table 52. In other words, the χ-axis swing mechanism includes a χ-axis drive motor 85, a driving force transmission belt 86, a worm 87, and a worm wheel 88.

The fan-shaped worm wheel 88 is provided at a position below the bearing 52a provided at one end portion of the X-axis moving frame 51, and the pitch circle thereof is positioned on the same axis as the swing support shaft 74 supported by the bearing 52a.

The χ-axis drive motor 85 and the worm 87 are installed on the outer surface of the side wall of the χ-axis rotating table 52. A driving force transmission belt 86 is wound between a drive-side pulley 89 provided on the rotational driving shaft of the χ-axis drive motor 85 and a driven-side pulley 90 provided on the rotating shaft of the worm 87. As a result, the rotational driving force from the χ-axis drive motor 85 is transmitted to the worm 87 via the driving force transmission belt 86. This rotational driving force causes the worm 87 to rotate and turn along the pitch circle of the worm wheel 88, and the χ-axis rotating table 52 rotates around the swing support shaft 74 integrally with the worm 87. The central axis of the swing support shaft 74 is positioned so as to match the χ-axis shown in FIG. 1B.

The optical axis angle of incident X-rays with respect to the sample S supported by the sample holder 42 can be arbitrarily changed by driving the above-mentioned χ-axis swing mechanism and the rotation arm 11 of the goniometer 10.

As shown in FIG. 12, the sample stage 40 of the present embodiment is configured so that the cross-sectional area of the cavity 43 is increased from an upper end opening portion 43a communicating with the X-ray transmission hole 57 of the sample holding frame 56 to a lower end opening portion 43b through which incident X-rays are taken in. As a result, an angle range in which the incident X-rays can be inclined without being blocked by members around the cavity 43 (that is, an angle range in which the optical axis of the incident X-rays with respect to the sample S can be inclined) is widened, and thus it is possible to flexibly adapt to various measurement conditions.

For example, in a dimensional example shown in FIG. 12, the optical axis of X-rays incident from the vertical direction can be inclined at an angle of 20° or less with respect to a semiconductor wafer (sample S) of 150 mm in radius.

[Structure of External Housing]

Figure 13:
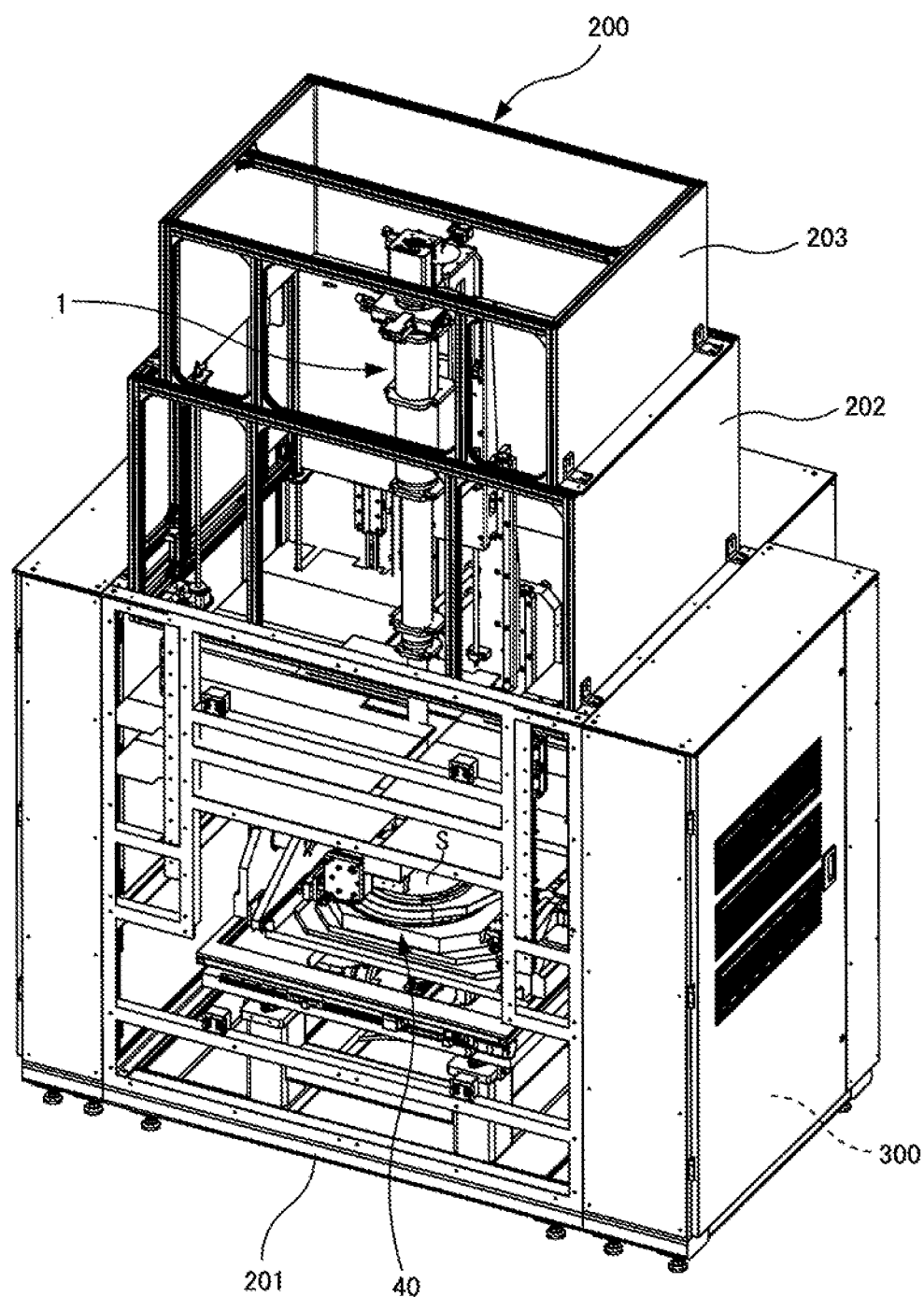
FIG. 13 is a perspective view showing a state in which the transmission type small-angle scattering device according to the embodiment of the present invention is covered with an external housing.
Figure 14:
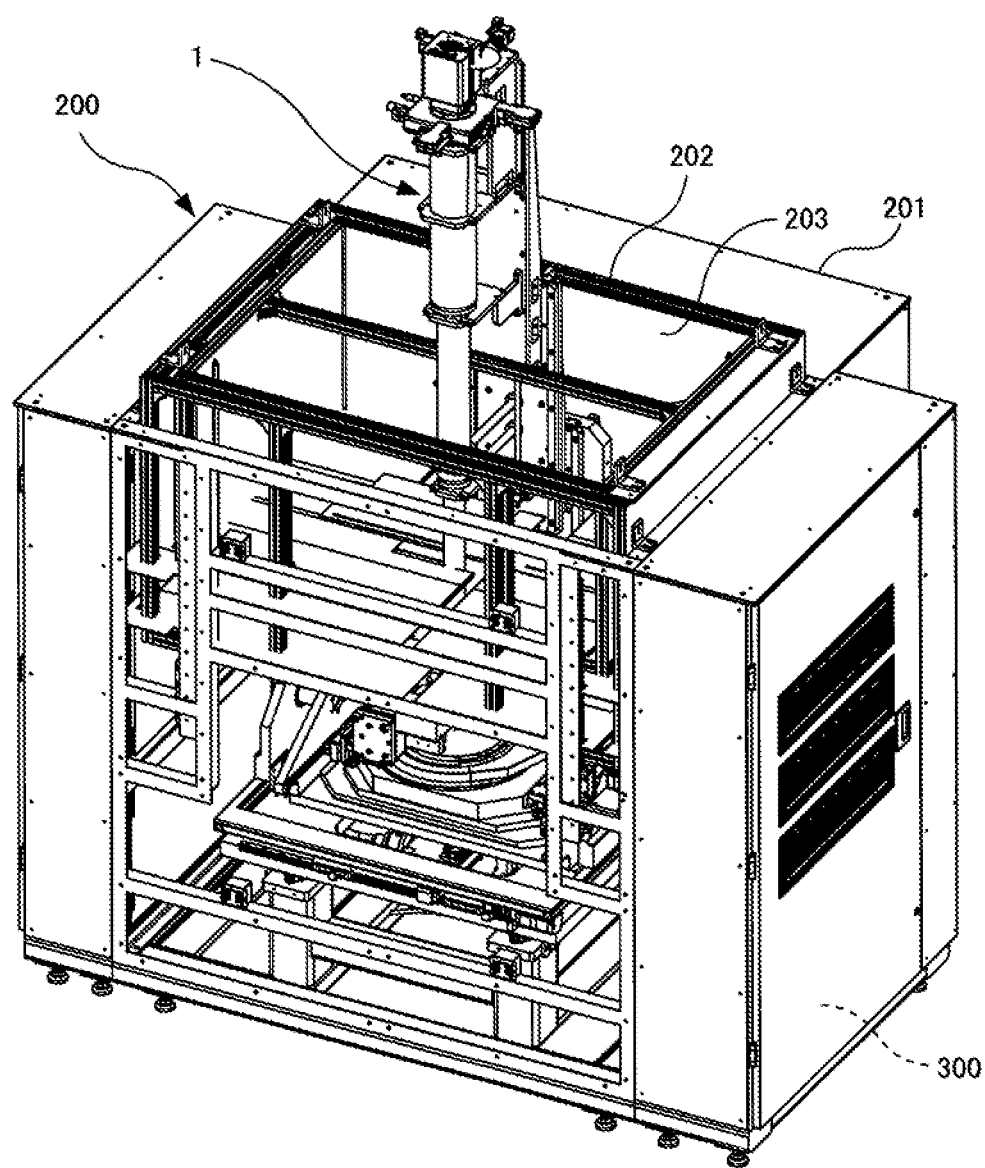
FIG. 14 is a perspective view showing a state in which the external housing according to the embodiment of the present invention is folded.
Figure 15B:
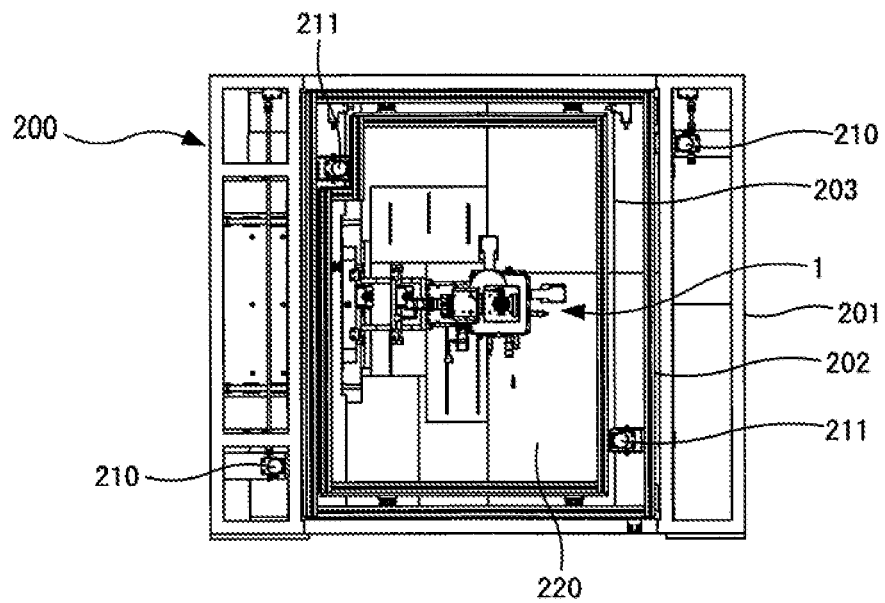
FIG. 15B is also a plan view.
Figure 15A:
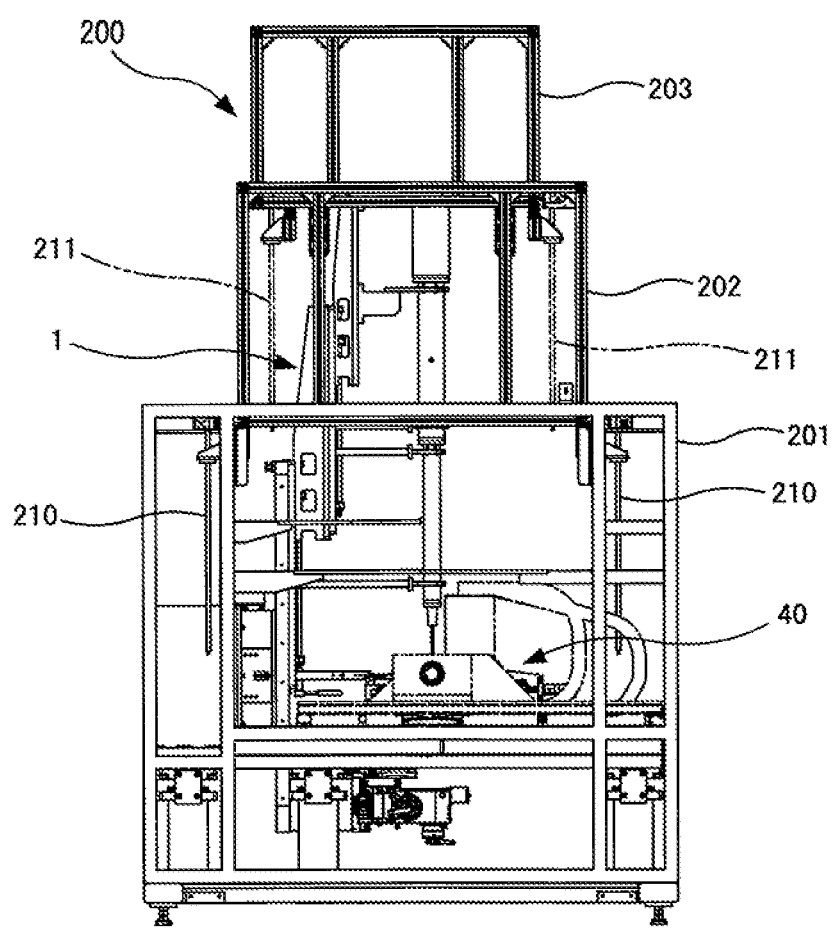
FIG. 15A is a left side view showing a state in which the transmission type small-angle scattering device according to the embodiment of the present invention is covered with the external housing.
Figure 16:
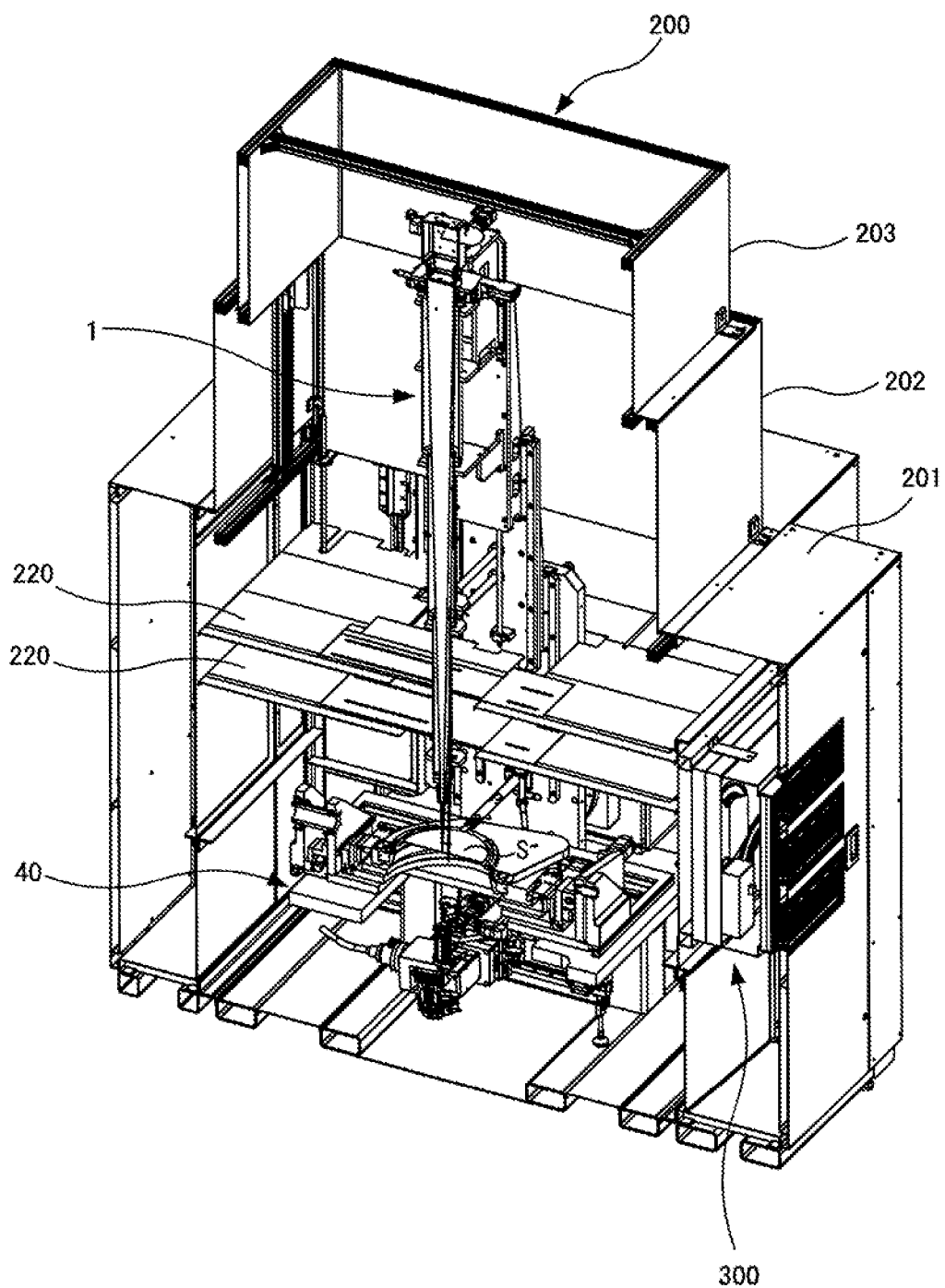
FIG. 16 is a longitudinally sectional view showing a state in which the transmission type small-angle scattering device according to the embodiment of the present invention is covered with the external housing.

FIG. 13 is a perspective view showing a state in which the transmission type small-angle scattering device according to the present embodiment is covered with an external housing. FIG. 15A is also a left-side view, FIG. 15B is also a plan view, and FIG. 16 is also a longitudinally sectional view. FIG. 14 is a perspective view showing a state in which the external housing is folded.

Generally, a transmission type small-angle scattering device using X-rays is installed in a state in which the periphery thereof is covered with an external housing for protection against X-rays.

The transmission type small-angle scattering device 1 according to the present embodiment has a vertically elongated structure in order to irradiate the sample S supported by the sample holder 42 with X-rays in the vertical direction (see FIGS. 1A to 3). Therefore, as shown in FIG. 13, the external housing 200 also has a vertically elongated structure.

Here, in the present embodiment, the external housing 200 includes a housing main body 201 and a plurality of housing element members 202 and 203, and is configured so that each of the housing element members 202 and 203 is freely movable in the vertical direction with respect to the housing main body 201.

Specifically, as shown in FIGS. 15A and 15B, the housing element member 202 on the middle stage is freely movable in the vertical direction along guide rails 210 with respect to the housing main body 201, and further the housing element member 203 on the upper stage is freely movable in the vertical direction along guide rails 211 with respect to the housing element member 202.

The driving force from a drive motor (not shown) is transmitted to each of the housing element members 202 and 203 via a drive mechanism (not shown) to drive the housing element members 202 and 203 in the vertical direction.

When the external housing 200 is transported or installed on site, as shown in FIG. 14, both the housing element members 202 and 203 are moved to a lower position and set to be overlapped with one another and folded up inside the housing main body 201. As described above, the external housing 200 is set to be in a compact form having a small height dimension, so that a transportation work and an installation work of the external housing 200 can be extremely easily performed, and it is possible to realize shortening of the work times required for these works and reduction of labors for these works.

If the external housing 200 is configured so that the respective housing element members 202 and 203 are disassembled from the housing main body 201, a disassembling/assembling work would be troublesome because the external housing 200 is a heavy object. However, as described above, the external housing 200 is configured so that the housing element members 202 and 203 are driven in the vertical direction with the driving force of the drive motor, whereby the disassembling/assembling work on site is not required, and the installation work and the removal work on site can be further easily performed.

Note that in FIGS. 13 to 15A, a part or all of the wall surface covering the transmission type small-angle scattering device is omitted in order to visually recognize the inside of the external housing 200. Further, a substrate feeding device 310 is juxtaposed with the external housing 200 in front of the external housing 200 as described later, and the external housing 200 is configured so as to have no wall surface on the side where the substrate feeding device 310 is juxtaposed, and the substrate feeding device 310 communicates with the inside of the external housing 200.

Further, as shown in FIG. 16, the internal space of the external housing 200 is vertically partitioned into upper and lower spaces by shielding panels 220 which are horizontally arranged above the sample stage 40. The lower space partitioned by the shielding panels 220 (that is, the lower space in which the sample stage 40 is installed) is supplied with air from which dust has been removed with high accuracy in a fan filter unit 300 juxtaposed outside the external housing 200. As a result, the lower space becomes a clean space with extremely little dust, and it is possible to prevent dust from adhering to the semiconductor wafer (sample S) supported by the sample holder 42.

The shielding panels 220 block the upward flow of air from the fan filter unit 300, and realize an efficient and economical supply of air to the semiconductor wafer and its surroundings.

[Overall Structure as Semiconductor Inspection Device]

Figure 17:
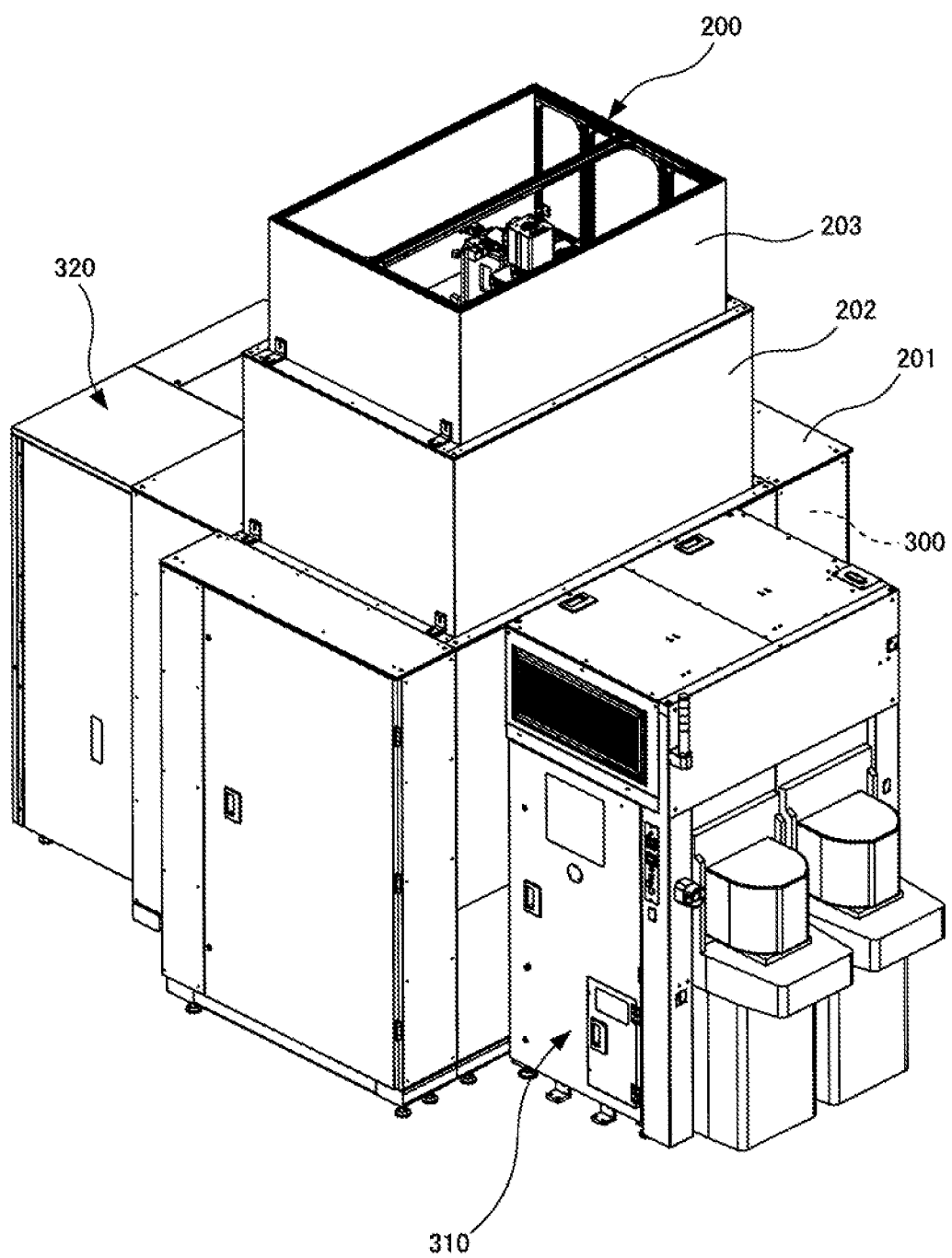
FIG. 17 is a perspective view showing the appearance of a semiconductor inspection device incorporating the transmission type small-angle scattering device according to the embodiment of the present invention.

FIG. 17 is a perspective view showing the appearance of a semiconductor inspection device incorporating the transmission type small-angle scattering device according to the present embodiment.

As shown in FIG. 17, in addition to the fan filter unit 300 described above, a substrate feeding device (EFEM) 310 and an electrical component portion 320 are juxtaposed with the external housing 200 outside the external housing 200 that covers the periphery of the transmission type small-angle scattering device, thereby constituting the semiconductor inspection device.

The substrate feeding device 310 has a function of automatically feeding a semiconductor wafer (sample S) as a measurement target to the sample holder 42, and automatically carrying out a measured semiconductor wafer from the sample holder 42. Note that the semiconductor wafer is automatically carried out while it is stored in a hermetically sealed cassette (FOUP).

Further, in the electrical component portion 320 are installed a power supply for supplying electric power to the transmission type small-angle scattering device and a computer for controlling the device.

Furthermore, the semiconductor inspection device is equipped with equipment for supplying utilities (not shown).

With these configurations, the semiconductor inspection device incorporated with the transmission type small-angle scattering device according to the present embodiment automatically feeds the semiconductor wafer and realizes execution of in-line automatic measurement in the middle of the semiconductor manufacturing process.

[Control System]

Figure 18:
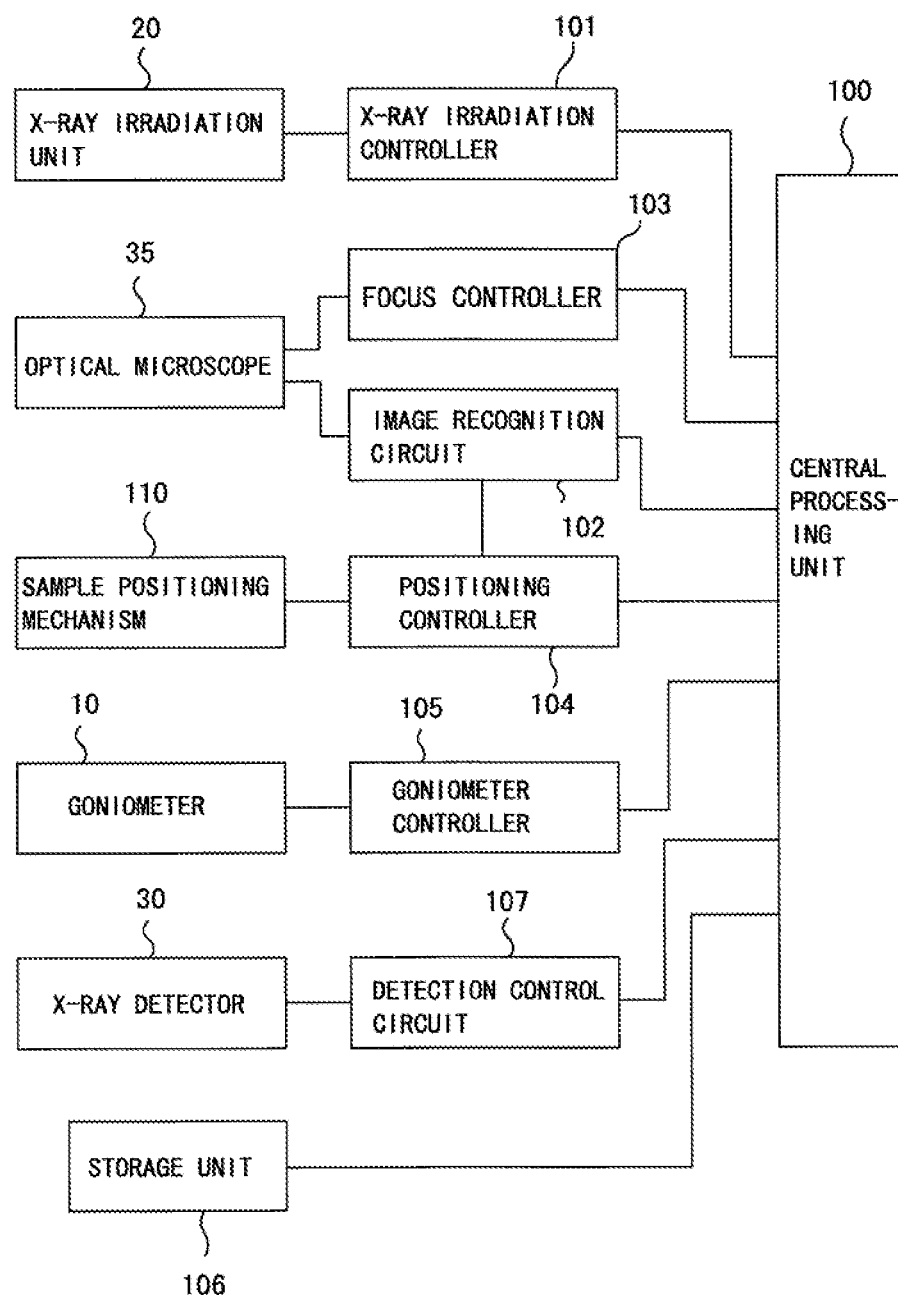
FIG. 18 is a block diagram showing a control system of the transmission type small-angle scattering device according to the embodiment of the present invention.

FIG. 18 is a block diagram showing a control system of the transmission type small-angle scattering device according to the present embodiment.

An X-ray irradiation controller 101 controls the X-ray irradiation unit 20.

Further, an image of the sample S captured by the optical microscope 35 is subjected to image recognition by an image recognition circuit 102. The optical microscope 35 and the image recognition circuit 102 constitute image observing means for observing the image of the sample S placed in the sample holder 42. Note that the focal position of the optical microscope 35 is adjusted by a focus controller 103.

A positioning controller 104 drives and controls a sample positioning mechanism 110. In particular, when an inspection target point of the sample S is placed at a measurement position P of the device, the positioning controller 104 drives and controls the sample positioning mechanism 110 based on the image of the sample S which has been captured by the optical microscope 35 and recognized by the image recognition circuit 102.

The goniometer 10 is driven and controlled by a goniometer controller 105.

Each of the components such as the X-ray irradiation controller 101, the image recognition circuit 102, the focus controller 103, the positioning controller 104, and the goniometer controller 105 operates based on setting information sent from a central processing unit 100. Here, the setting information is prestored as a recipe in a storage unit 106, and it is read out by the central processing unit 100 and output to each of the above-mentioned components.

The two-dimensional X-ray detector 30 is controlled by a detection control circuit 107.

[Execution Procedure of Measurement Operation]

Figure 19:
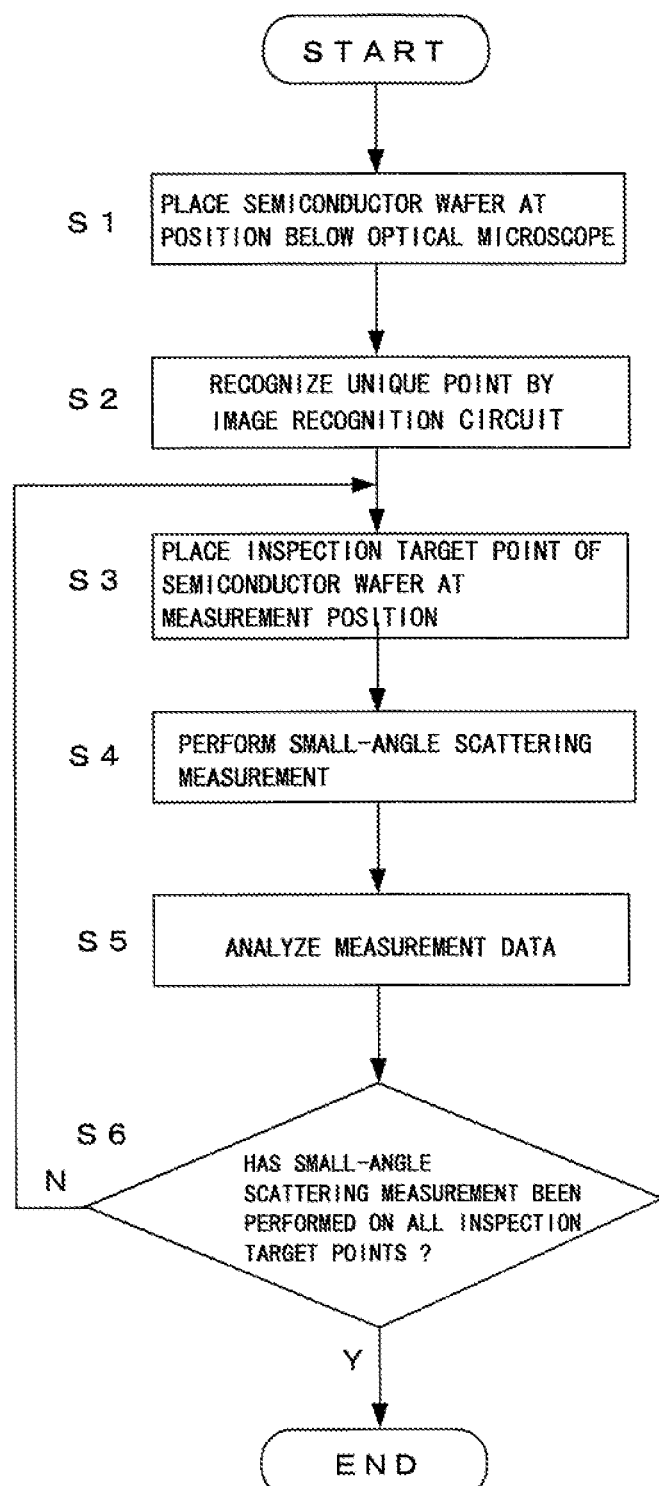
FIG. 19 is a flowchart showing an execution procedure of a measurement operation by the transmission type small-angle scattering device according to the embodiment of the present invention.

FIG. 19 is a flowchart showing an execution procedure of a measurement operation by the transmission type small-angle scattering device according to the present embodiment having the above-described configuration.

Here, a measurement operation when a semiconductor wafer having a circuit pattern of a semiconductor device formed thereon is used as the sample S will be described.

Software for executing small-angle scattering measurement is prestored in the storage unit 106, and the central processing unit 100 (CPU) executes the following processing steps according to the software.

After the semiconductor wafer which is the sample S as an inspection target is sucked and supported by the sample holder 42, the positioning controller 104 first drives and controls the sample positioning mechanism 110 to place the semiconductor wafer at a position below the optical microscope 35 (step S1).

Next, the surface of the semiconductor wafer is observed by the optical microscope 35, and the image recognition circuit 102 recognizes a unique point formed on the surface of the semiconductor wafer based on image data from the optical microscope 35 (step S2).

Here, the unique point formed on the surface of the semiconductor wafer is prestored as a recipe in the storage unit 106. As the unique point is set a portion which the image recognition circuit 102 can recognize without confusion based on image information from the optical microscope 35, such as a characteristic pattern shape formed on the surface of the semiconductor wafer.

Next, the positioning controller 104 drives and controls the sample positioning mechanism 110 to place a preset inspection target point at the measurement position P of the device based on position information of the inspection target point with the unique point recognized by the image recognition circuit 102 being set as a reference (Step S3).

Subsequently, small-angle scattering measurement is executed (step S4), and the central processing unit 100 analyzes measurement data (step S5).

Here, for example, when performing shape analysis measurement such as analysis of the tilt angle of a deep hole formed on the surface of the semiconductor wafer, by driving the rotation arm 11 of the goniometer 10 or by swinging the semiconductor wafer by the χ-axis swing mechanism, the optical axis angle of X-rays with respect to the semiconductor wafer is changed, whereby the shape analysis on the tilt angle of the deep hole, etc. can be performed.

Each of the steps S3 to S5 described above is executed on all inspection target points set on the semiconductor wafer (step S6), and after the small-angle scattering measurement is executed on all the inspection target points, the measurement operation is terminated.

[Measurement Example of Semiconductor Device and Inclination Measuring Means of Semiconductor Wafer]

A semiconductor device is usually formed on a semiconductor wafer, and scattering bodies as measurement targets are periodically arranged in a direction parallel to the principal plane of the semiconductor wafer.

Measurement targets include minute holes and pillars that constitute the semiconductor device.

Semiconductor devices are evolving in miniaturization and high integration day by day, and there are cases where the diameters of holes and pillars are several tens of nm and the depths (heights) thereof are several µm, resulting in extremely fine and high aspect ratio. By using the transmission type small-angle scattering device according to the present embodiment for such structures, it is possible to specify the accurate three-dimensional shapes of these holes and pillars.

Here, it is preferable to measure the inclination of the surface of the semiconductor wafer and adjust so that the surface of the semiconductor wafer is perpendicular to the optical axis of incident X-rays before performing the small-angle scattering measurement.

Figure 20A:
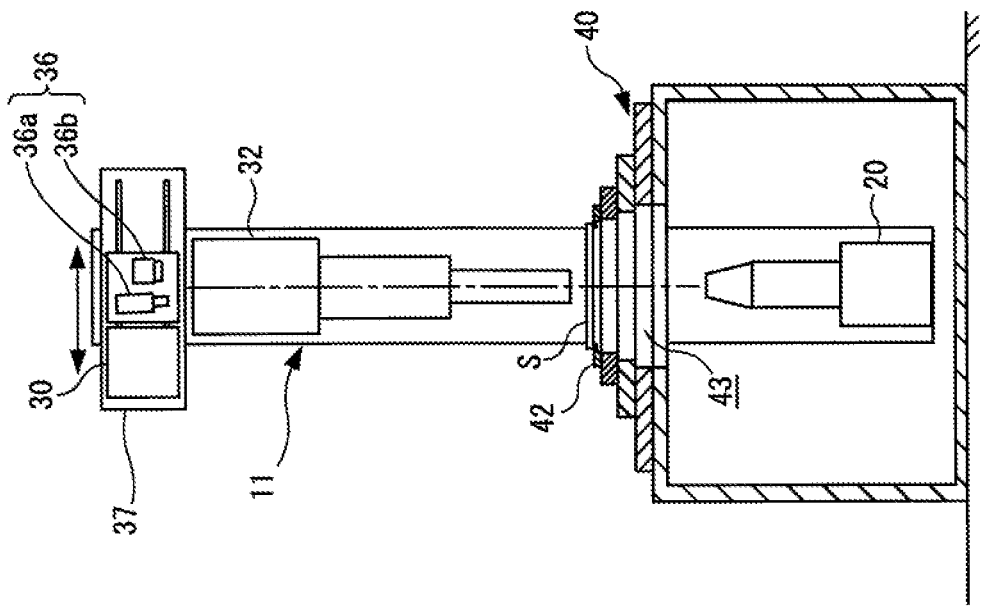
FIG. 20A is a front configuration diagram schematically showing a configuration example relating to means for measuring an inclination of a semiconductor wafer.

FIG. 20A is a front configuration diagram schematically showing a configuration example relating to means for measuring the inclination of the semiconductor wafer.

As shown in FIG. 20A, a laser inclination measuring device 36 is provided in the rotation arm 11 of the goniometer 10 to be arranged side by side with the two-dimensional X-ray detector 30. The two-dimensional X-ray detector 30 and the laser inclination measuring device 36 are installed in a moving table 37 that moves in the lateral direction.

The moving table 37 moves in the lateral direction with the driving force of a drive motor (not shown), and any one of the two-dimensional X-ray detector 30 and the laser inclination measuring device 36 can be placed at a position facing the optical axis O of X-rays emitted from the X-ray irradiation unit 20 while the two-dimensional X-ray detector 30 and the laser inclination measuring device 36 are switched to each other.

The laser inclination measuring device 36 includes a laser light source 36a and a laser detector 36b, and it has a function of irradiating the surface of the semiconductor wafer (sample S) supported by the sample holder 42 with laser light from the laser light source 36a, and detecting the laser light reflected from the surface of the semiconductor wafer by the laser detector 36b to measure the inclination of the surface of the semiconductor wafer with respect to the optical axis O.

Based on the inclination of the surface of the semiconductor wafer with respect to the optical axis O measured by the laser inclination measuring device 36, the χ-axis swing mechanism and the in-plane rotation mechanism of the sample stage 40 are driven to adjust the inclination of the surface of the semiconductor wafer so that the surface of the semiconductor wafer is vertical to the optical axis O of incident X-rays.

By adjusting the inclination of the surface of the semiconductor wafer as described above, the χ-axis swing mechanism and the rotation arm 11 of the goniometer 10 are driven with the adjusted orientation being defined as an origin (χ=0°, θ=0°), which makes it possible to arbitrarily change the optical axis angle of X-rays with respect to the semiconductor wafer.

By adjusting the inclination of the surface of the semiconductor wafer, it is possible to measure the positional relation (inclination) of the holes and pillars formed in the semiconductor wafer with the surface of the semiconductor wafer, and also it is possible to obtain useful information regarding the shape of the device.

Thereafter, the small-angle scattering measurement is executed according to a flowchart of FIG. 19.

Figure 20B:
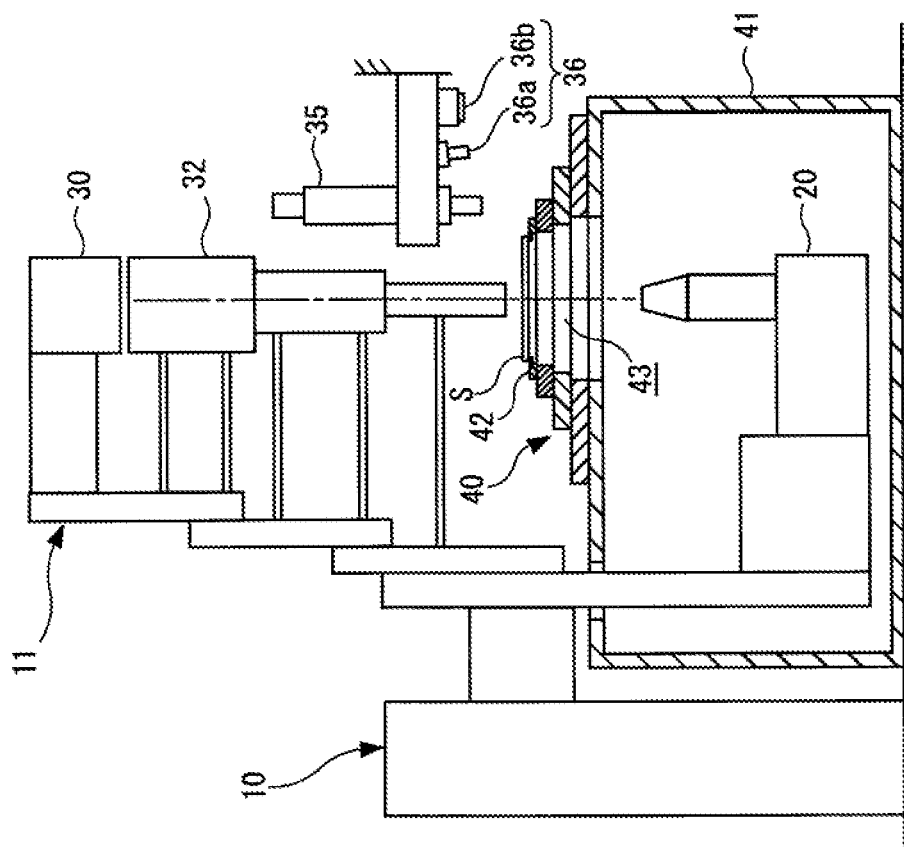
FIG. 20B is a side configuration diagram schematically showing another configuration example relating to the means for measuring the inclination of the semiconductor wafer.

FIG. 20B is a side configuration diagram schematically showing another configuration example relating to the means for measuring the inclination of the semiconductor wafer.

In the configuration shown in FIG. 20B, the laser inclination measuring device 36 is installed side by side with the optical microscope 35. In order to measure the inclination of the surface of the semiconductor wafer, the semiconductor wafer (sample S) supported by the sample holder is moved to a position below the laser inclination measuring device 36 by driving the Y-axis moving mechanism and the X-axis moving mechanism of the sample stage 40.

The laser inclination measuring device 36 has a function of measuring the inclination of the surface of the semiconductor wafer by irradiating the surface of the semiconductor wafer with laser light from the laser light source 36a and detecting the laser light reflected from the surface of the semiconductor wafer by the laser detector 36b.

Here, for example, if the positions of the laser light source 36a and the laser detector 36b are adjusted in advance so that the laser inclination measuring device 36 can measure an inclination with the horizontal plane set as a reference, the inclination of the surface of the semiconductor wafer with respect to the horizontal plane or the vertical axis can be measured.

Note that the present invention is not limited to the above-described embodiment, and it goes without saying that various modifications and applications can be carried out as needed.

For example, the rotation arm is not limited to the configuration including the three arm members 12, 13 and 14 as shown in FIG. 4, and it may include two or four or more arm members.

Further, as shown in FIGS. 13 to 16, the external housing is not limited to the configuration in which the two housing element members 202 and 203 are freely movable with respect to the housing main body 201, and it may be configured so that one or three or more housing element members are freely movable with respect to the housing main body. Further, the movement of these housing element members may be configured to be manually moved as needed instead of use of the driving force from the drive motor.

The invention claimed is:

1. A transmission type small-angle scattering device comprising:
    a sample holder in which a sample as an inspection target is placed;
    a sample positioning mechanism for moving the sample holder;
    a goniometer including a rotation arm;
    an X-ray irradiation unit installed on the rotation arm; and a two-dimensional X-ray detector installed on the rotation arm, wherein the rotation arm is freely turnable around a θ-axis extending in a horizontal direction from an origin with a vertical arrangement state of the rotation arm being defined as the origin;

the X-ray irradiation unit is installed on a lower-side end portion of the rotation arm;

the two-dimensional X-ray detector is installed on an upper-side end portion of the rotation arm;

the X-ray irradiation unit irradiates the sample placed in the sample holder with focused X-rays from a lower side of the sample; and the two-dimensional X-ray detector detects scatter X-rays generated around the focused X-rays transmitted through the sample at a position above the sample.

2. The transmission type small-angle scattering device according to claim 1, wherein the rotation arm comprises a plurality of arm members, and is configured so that one of the plurality of arm members is fixed to a θ rotation axis of the goniometer, and the other arm members slide with respect to the arm member fixed to the θ rotation axis to overlap and fit the fixed arm member.

3. The transmission type small-angle scattering device according to claim 2, wherein the sample holder is formed inside a sample holding frame, an inside of the sample holding frame serves as an X-ray transmission hole, and the sample holder is configured to support the sample while facing the X-ray transmission hole.

4. The transmission type small-angle scattering device according to claim 3, wherein suction support pieces are provided on an inner peripheral edge of the sample holding frame so as to protrude inward from a plurality of places of the inner peripheral edge, and configured to suck and support a part of an outer peripheral edge portion of the sample.

5. The transmission type small-angle scattering device according to claim 1, wherein the sample positioning mechanism includes an in-plane rotation mechanism for causing the sample supported by the sample holder to rotate within a plane, a Y-axis moving mechanism for moving the sample holder in a longitudinal direction, an X-axis moving mechanism for moving the sample holder in a lateral direction, a Z-axis moving mechanism for moving the sample holder in a vertical direction, and a swing mechanism for swinging the sample holder, and wherein the Z-axis moving mechanism includes a guide member and a sliding member which are combined with each other in a wedge-like shape and configured so that the sliding member is pushed up when the guide member moves in one direction, whereas the sliding member is descended when the guide member moves in an opposite direction, thereby moving the sample holder in the vertical direction together with the sliding member.

6. The transmission type small-angle scattering device according to claim 1, further comprising an external housing for covering a periphery of the transmission type small-angle scattering device, wherein the external housing includes a housing main body and one or a plurality of housing element members, and the housing element members are freely movable in a vertical direction with respect to the housing main body, and wherein the housing element members are configured to set a form in which the housing element members are overlapped with the housing main body and folded up, and a form in which the housing element members are protracted from the housing main body.

* * * * *